US006735374B1

(12) United States Patent
Hashimoto

(10) Patent No.: US 6,735,374 B1
(45) Date of Patent: May 11, 2004

(54) PICTURE PROCESSING APPARATUS AND METHOD

(75) Inventor: Tsutomu Hashimoto, Osaka (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 0 days.

(21) Appl. No.: 09/526,484

(22) Filed: Mar. 15, 2000

(30) Foreign Application Priority Data

Mar. 16, 1999 (JP) ............................................ 11-070368

(51) Int. Cl.$^7$ ............................. H04N 5/91; H04N 7/26; H04N 5/85
(52) U.S. Cl. ............................. 386/46; 386/109; 386/68; 386/125
(58) Field of Search .......................... 386/46, 711, 109, 386/112, 27, 33, 124, 125, 126, 45, 40, 68, 67, 6; 375/240.16; 382/238, 236; 348/409.1, 412.1, 413.1, 415.1, 416.1; H04N 5/91, 7/26, 5/85

(56) References Cited

U.S. PATENT DOCUMENTS 5,634,850 A    6/1997  Kitahara et al.

2001/0055430 A1 * 12/2001 Takahashi et al. .......... 382/284

FOREIGN PATENT DOCUMENTS

JP          08101904 A  *  4/1996  ............. G06T/1/00
JP          09270002      10/1997
JP          10164472       6/1998

* cited by examiner

Primary Examiner—Robert Chevalier
(74) Attorney, Agent, or Firm—Wenderoth, Lind & Ponack L.L.P.

(57) ABSTRACT

A picture processing apparatus transmits information of motion included in an original moving picture and realizes a display having a sense of motion, also when frames are thinning out and only part of picture data is displayed. The picture processing apparatus includes a motion generation unit and performs weighted addition for each of pixels constituting the picture data as a processing target, by using pixel values of plural pixels, on the basis of a motion vector corresponding to the picture data, and generates picture data which was subjected to a motion generation and addition processing, thereby to use this picture data for display or transmission.

20 Claims, 15 Drawing Sheets time series

Fig.20

| (0,0) | (1,0) | (2,0) | ········ | (U-2,0) | (U-1,0) |
|---|---|---|---|---|---|
| (0,1) | (1,1) | (2,1) | ········ | (U-2,1) | (U-1,1) |
| (0,2) | (1,2) | (2,2) | ········ | (U-2,2) | (U-1,2) |
| ⋮ | ⋮ | ⋮ | | ⋮ | ⋮ |
| (0,V-1) | (1,V-1) | (2,V-1) | ········ | (U-2,V-1) | (U-1,V-1) |

PICTURE PROCESSING APPARATUS AND METHOD

FIELD OF THE INVENTION

The present invention relates to a picture processing apparatus and method and, more particularly, to a picture processing apparatus and method which receive picture data and change information as information for indicating a temporal change in the picture data, thereby to generate picture data for display.

BACKGROUND OF THE INVENTION

The technology of digitizing a picture to obtain digital picture data is an important technology for display or transmission of picture data in broadcasting, picturephones, videoconferences, computer network systems and the like. As for storage of the digital picture data, mass storage media such as DVDs are becoming widespread and coded moving picture data compressed according to MPEG1, MPEG2 or the like is usually stored in these media.

The data stored in such a medium is reproduced by a reproduction apparatus including a DVD player when the medium is a DVD. In the case of reproduction using data transmitted in a network system or the like, the normal reproduction of displaying pictures similar to original moving pictures is exclusively performed. On the other hand, in the case of the reproduction by the above reproduction apparatus, various trick reproduction functions are mostly provided for users' convenience. As examples of the trick reproduction functions, there are reverse reproduction of reproducing a picture in the direction opposite in the time series to that of an original moving picture, high-speed reproduction of reproducing a picture so as to have a higher-speed motion than that of an original moving picture, and high-speed reverse reproduction of reproducing a picture at higher speeds and in the opposite direction.

For example, in a case where compressively coded data stored in the DVD is reproduced by the reproduction apparatus including the DVD player, when the normal reproduction is performed, the apparatus expansively decodes the compressively coded data successively and outputs (displays or the like) the data. On the other hand, when the high-speed reproduction is performed, the apparatus usually outputs (displays or the like) only part of data, thereby to realize a high-speed display. The compressively coded moving picture data is generally processed with one screen, i.e. one frame, as a unit. Therefore, while respective frames are successively processed to display pictures in the normal reproduction, a frame-drop processing of thinning out part of frames is performed in the high-speed reproduction. For example, when picture data consists of 25 frames per second, and only one frame among the 25 frames is processed and output, 25-time speed reproduction is performed.

FIG. 15 is a diagram for explaining the normal reproduction and the high-speed reproduction for moving picture data taking a frame as a unit. Each of F1 to F13 shown in the figure illustrates a picture of each frame included in output pictures of the normal reproduction. These pictures are to be reproduced in this order according to the time series. When the reproduction apparatus normally reproduces this data, data of F1 to F13 is successively output in a cycle according to the television signal standards such as NTSC or PAL.

The arrows in the figure indicate the order of outputting frames in the high-speed reproduction of quadruple-speed. In this case, after an F1 frame is output, an F5 frame is output and then F9 and F13 frames are successively output. Therefore, only one frame is output every four frames, whereby the high-speed reproduction of quadruple-speed is realized.

In the case of reverse reproduction, frames are successively reproduced from F13 to F1 in the reverse order to the time series. In the case of high-speed reverse reproduction, also one frame is output every four frames, i.e. F13, F9, F5, and F1 are output in the reverse order to the time series, whereby the high-speed reverse reproduction of quadruple-speed is realized.

As described above, these trick reproduction functions are popular in the reproduction apparatus. However, also in the case of transmission of picture data, when the transmission at a low bit rate is required, frames are thinned out in a similar way to the high-speed reproduction, thereby transmitting output data.

As described above, prior art picture processing apparatuses thin out frames to output (display or transmit) pictures, thereby realizing the high-speed reproduction. However, since frames which are targets to be thinned out are not output at all in this processing, information about motions of moving pictures, which is included in the frames to be thinned out is completely lost.

Assume that an object has a motion from the right to the left in the frames F2 to F7 of the picture data shown in FIG. 15. When the high-speed reproduction of quadruple-speed is performed for this picture data, the motion of the object from the right to the left is not transmitted at all by information transmitted with only the frame F5. Therefore, users who utilize a displayed result of the high-speed reproduction cannot obtain information as to how the object moves or whether the object is not moving but stops.

In addition, when the prior art picture processing apparatus performs the high-speed reproduction by thinning out frames, output frames are discontinuous. Therefore, only displays which make the users feel disorder are obtained.

Further, when the prior art picture processing apparatus performs the high-speed reproduction by thinning out the frames, the users cannot easily obtain information as to whether the normal reproduction or high-speed reproduction is performed, from only the displayed result. That is, not only when the degree of thinning is low (relatively low speed) but also the degree of thinning is high (relatively high speed), although the display makes the users feel disorder as describe above, the users cannot easily know whether the high-speed reproduction is performed or moving pictures for producing special effects are normally reproduced.

Also when the data is transmitted by thinning out frames as described above in the transmission at a low bit rate, the same phenomenon occurs when the data is displayed and utilized at a transmission destination.

SUMMARY OF THE INVENTION

It is an object of the present invention to provide a picture processing apparatus and method which can transmit information about motions included in original pictures also in the case of the high-speed reproduction.

In addition, it is an object of the present invention to provide a picture processing apparatus and method which can realize good displays having less disorder due to discontinuous displays also in the case of the high-speed reproduction.

It is an object of the present invention to provide a picture processing apparatus and method which allow the users to easily know whether the high-speed reproduction is performed or not, from a display screen or the like.

It is an object of the present invention to provide a picture processing apparatus and method which transmit information of motions, produce no disorder, and allow the user to easily know reproduction states, also when it transmits data by thinning out frames in a similar way to the high-speed reproduction.

Other objects and advantages of the present invention will become apparent from the detailed description and specific embodiments described are provided only for illustration since various additions and modifications within the spirit and scope of the invention will be apparent to those of skill in the art from the detailed description.

According to a 1st aspect of the present invention, a picture processing apparatus which receives picture data and change information as information for indicating a temporal change in the picture data and generates displayed picture data, comprises a motion generation unit for performing weighted addition for pixels constituting the picture data on the basis of the change information, and generating the displayed picture data. Accordingly, the displayed picture data includes the motion information and a display result having a sense of motion can be obtained. Therefore, a display having less disorder relative to the prior art picture processing apparatus can be realized, and users can easily know a reproduction state because the motion information is added to the picture data.

According to a 2nd aspect of the present invention, in the picture processing apparatus of the 1st aspect, the motion generation unit uses the change information which is previously added to each unit picture data, thereby to perform the weighted addition for pixels constituting the unit picture data. Therefore, a display result which corresponds to a state of a picture more appropriately can be obtained.

According to a 3rd aspect of the present invention, in the picture processing apparatus of the 1st aspect, the motion generation unit generates, on the basis of plural pieces of the change information which is previously added to each unit picture data, change information corresponding to processing unit picture data which is a smaller unit than the unit picture data, and uses the generated change information corresponding to the processing unit picture data, thereby to perform the weighted addition for pixels constituting the processing unit picture data. Therefore, a display result which corresponds to a state of a picture more appropriately can be obtained.

According to a 4th aspect of the present invention, in the picture processing apparatus of the 2nd aspect, the motion generation unit comprises a move amount and weighting factor decision unit for deciding a move amount and weighting factors for each pixel, from the change information; a processing target pixel decision unit for deciding a pixel as a processing target on the basis of the move amount; and a weighted addition unit for performing the weighted addition for pixel data of the pixel as the processing target, by using the weighting factors. Therefore, a display result which corresponds to a state of a picture more appropriately can be obtained.

According to a 5th aspect of the present invention, in the picture processing apparatus of the 3rd aspect, the motion generation unit comprises a motion vector interpolation unit for generating, on the basis of plural pieces of the change information which is added to each unit picture data, change information corresponding to the processing unit picture data which is a smaller unit than the unit picture data; a move amount and weighting factor decision unit for deciding a move amount and weighting factors for each pixel, from the change information corresponding to the processing unit picture data; a processing target pixel decision unit for deciding a pixel as a processing target, on the basis of the move amount; and a weighted addition unit for performing the weighted addition for pixel data of the pixel as the processing target, by using the weighting factors. Therefore, a display result which corresponds to a state of a picture more appropriately can be obtained.

According to a 6th aspect of the present invention, in the picture processing apparatus of any of the 1st to 3rd aspects, the motion generation unit obtains change information transition information for indicating a temporal change in the change information, and performs the weighted addition for the pixels constituting the picture data on the basis of the obtained change information transition information, thereby to generate the displayed picture data. Therefore, a display result which corresponds to a state of a picture more appropriately can be obtained.

According to a 7th aspect of the present invention, in the picture processing apparatus of the 4th or 5th aspect, the move amount and weighting factor decision unit comprises a change information storage unit for storing the input change information, and decides the move amount and the weighting factors for each pixel on the basis of plural pieces of change information at different times, which change information is stored in the change information storage unit. Therefore, a display result which corresponds to a state of a picture more appropriately can be obtained.

According to an 8th aspect of the present invention, the picture processing apparatus of any of the 1st to 3rd aspects further comprises a reproduction information input unit for inputting reproduction information which indicates a display state of the displayed picture data, and the motion generation unit generates the displayed picture data by using the reproduction information. Therefore, a display result which corresponds to a state of a picture more appropriately can be obtained.

According to a 9th aspect of the present invention, the picture processing apparatus of any of the 1st to 3rd aspects further comprises a threshold judgement processing unit for comparing the input change information with a threshold, and generating second change information on the basis of a result of the comparison, and the motion generation unit generates the displayed picture data by using the second change information. Accordingly, when the camera shake having a micro motion vector, or a picture or object having almost no motion vector is included, the motion information is not added. Therefore, the risk that the picture including the camera shake is erroneously recognized as the motion of the picture can be avoided. Since unnecessary motion information is not given to the picture, a picture processing apparatus can transmit the motion of an original picture and obtain a good picture including less disorder or displeasure.

According to a 10th aspect of the present invention, the picture processing apparatus of any of the 1st to 3rd aspects further comprises a motion vector processing unit for multiplying a value of the input change information by a predetermined factor and generating second change information, and the motion generation unit generates the displayed picture data by using the second change information. Therefore, a picture having an emphasized motion information added thereto, or contrary a picture having a suppressed motion information added thereto can be generated. Accordingly, a picture processing apparatus can generate and display a picture to which more dynamic presence is added, or motion information is added with the presence being reduced.

According to an 11th aspect of the present invention, the picture processing apparatus of any of the 1st to 3rd aspects further comprises a region judgement unit for judging a region of the picture data, as a processing target. Therefore, a region to which the motion information is added can be arbitrarily decided. Accordingly, a part in which dynamic presence is to be given can be distinguished from other parts according to provided picture data.

According to a 12th aspect of the present invention, a picture processing method which receives picture data and change information as information for indicating a temporal change in the picture data and generates displayed picture data, comprises a step of performing weighted addition for pixels constituting the picture data on the basis of the change information, thereby generating the displayed picture data. Accordingly, the displayed picture data includes the motion information and a display result having a sense of motion can be obtained. Therefore, a display having less disorder relative to the prior art picture processing apparatus can be realized, and users can easily know a reproduction state because the motion information is added to the picture data.

According to a 13th aspect of the present invention, the picture processing method of the 12th aspect comprises a step of using the change information which is previously added to each unit picture data, thereby performing the weighted addition for pixels constituting the unit picture data. Therefore, a display result which corresponds to a state of a picture more appropriately can be obtained.

According to a 14th aspect of the present invention, the picture processing method of the 12th aspect comprises steps of on the basis of plural pieces of the change information which is previously added to each unit picture data, generating change information corresponding to processing unit picture data which is a smaller unit than the unit picture data; and using the generated change information corresponding to the processing unit picture data, thereby performing the weighted addition for pixels constituting the processing unit picture data. Therefore, a display result which corresponds to a state of a picture more appropriately can be obtained.

According to a 15th aspect of the present invention, the picture processing method of any of the 12th to 14th aspects comprises steps of obtaining change information transition information for indicating a temporal change in the change information; and performing the weighted addition for the pixels constituting the picture data on the basis of the obtained change information transition information, thereby generating the displayed picture data. Therefore, a display result which corresponds to a state of a picture more appropriately can be obtained.

According to a 16th aspect of the present invention, the picture processing method of any of the 12th to 14th aspects comprises a step of receiving reproduction information for indicating a display state of the displayed picture data, and generating the displayed picture data by using the reproduction information. Therefore, a display result which corresponds to a state of a picture more appropriately can be obtained.

According to a 17th aspect of the present invention, the picture processing method of any of the 12th to 14th aspects comprises a step of comparing the input change information with a threshold, and generating the displayed picture data by using second change information generated on the basis of a result of the comparison. Accordingly, when the camera shake having a micro motion vector, or a picture or object having almost no motion vector is included, the motion information is not added. Therefore, the risk that the picture including the camera shake is erroneously recognized as the motion of the picture can be avoided. Since unnecessary motion information is not given to the picture, a picture processing apparatus can transmit the motion of an original picture and obtain a good picture including less disorder or displeasure.

According to an 18th aspect of the present invention, the picture processing method of any of the 12th to 14th aspects comprises a step of generating the displayed picture data by using second change information generated by multiplying a value of the input change information by a predetermined factor. Therefore, a picture having an emphasized motion information added thereto, or contrary a picture having a suppressed motion information added thereto can be generated. Accordingly, a picture processing apparatus can generate and display a picture to which more dynamic presence is added, or motion information is added with the presence being reduced.

According to a 19th aspect of the present invention, the picture processing method of any of the 12th to 14th aspects comprises steps of judging a region of the picture data as a processing target, and generating the displayed picture data by using a result of the judgement. Therefore, a region to which the motion information is added can be arbitrarily decided. Accordingly, a part in which dynamic presence is to be given can be distinguished from other parts according to provided picture data.

According to a 20th aspect of the present invention, there is provided a computer readable recording medium on which a program for causing a computer to execute weighted addition for pixels constituting picture data on the basis of change information as information for indicating a temporal change in the picture data is recorded.

According to a picture processing apparatus or method of the present invention, also when a picture is transmitted at a low bit rate, an original motion of the picture is transmitted, thereby obtaining the same effects as in the case of the reproduction time.

BRIEF DESCRIPTION OF THE DRAWINGS

FIG. 20 is a diagram showing macroblocks constituting picture data stored in a first frame memory included in the apparatus of the sixth embodiment.

DETAILED DESCRIPTION OF THE PREFERRED EMBODIMENTS

Embodiment 1

A picture processing apparatus according to a first embodiment of the present invention generates motion information on the basis of a motion vector of each macroblock, and adds the motion information to picture data.

Figure 1:
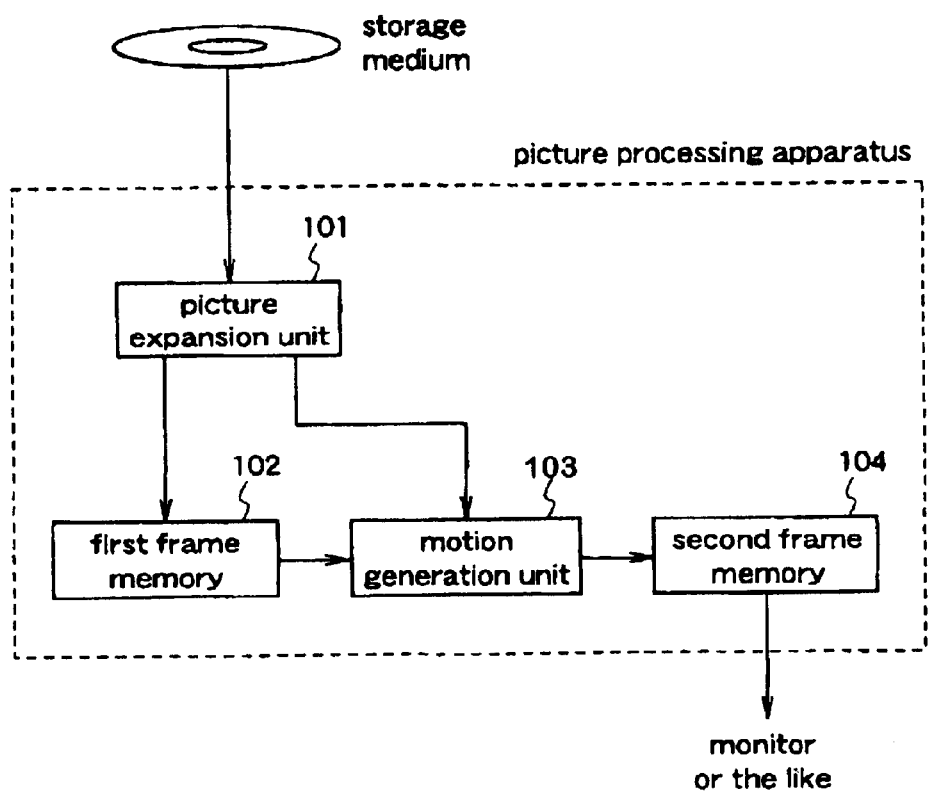
FIG. 1 is a block diagram illustrating a whole structure of a picture processing apparatus according to a first embodiment of the present invention.

FIG. 1 is a block diagram illustrating a whole structure of the picture processing apparatus of the first embodiment. As shown in the figure, the picture processing apparatus of the first embodiment comprises a picture expansion unit 101, a first frame memory 102, a motion generation unit 103, and a second frame memory 104. This picture processing apparatus receives compressively coded digital moving picture data from a storage medium such as a DVD as an apparatus input to the picture processing apparatus, and outputs displayed data as an apparatus output of the picture processing apparatus to a displaying monitor or the like. The apparatus input and output of the picture processing apparatus can be transmitted by a network or the like.

The picture expansion unit 101 subjects the coded picture data as the apparatus input to an expansive decoding as the reverse processing to the compressive coding, thereby to generate expanded picture data. The first frame memory 102 stores the expanded picture data generated by the picture expansion unit 101. As the first frame memory 102, a storage medium such as a DRAM memory can be used.

The motion generation unit 103 subject the expanded picture data stored in the first frame memory 102 to a motion generation and addition processing of adding information for transmitting a motion of a picture (hereinafter referred to as motion information), thereby to generate picture data with motion information. The second frame memory 104 is a temporary storage medium which is used as a working area for the motion generation and addition processing by the motion generation unit 103, and stores the picture data with motion information generated by the motion generation unit 103 as displayed picture data. As the second frame memory 104, a storage medium such as a DRAM memory can be used like the first frame memory 102.

The picture processing apparatus of the first embodiment uses a motion vector which is added to each of macroblocks (described later) as unit picture data constituting the picture data, thereby performing a weighted addition processing for pixels constituting the macroblock.

Figure 2:
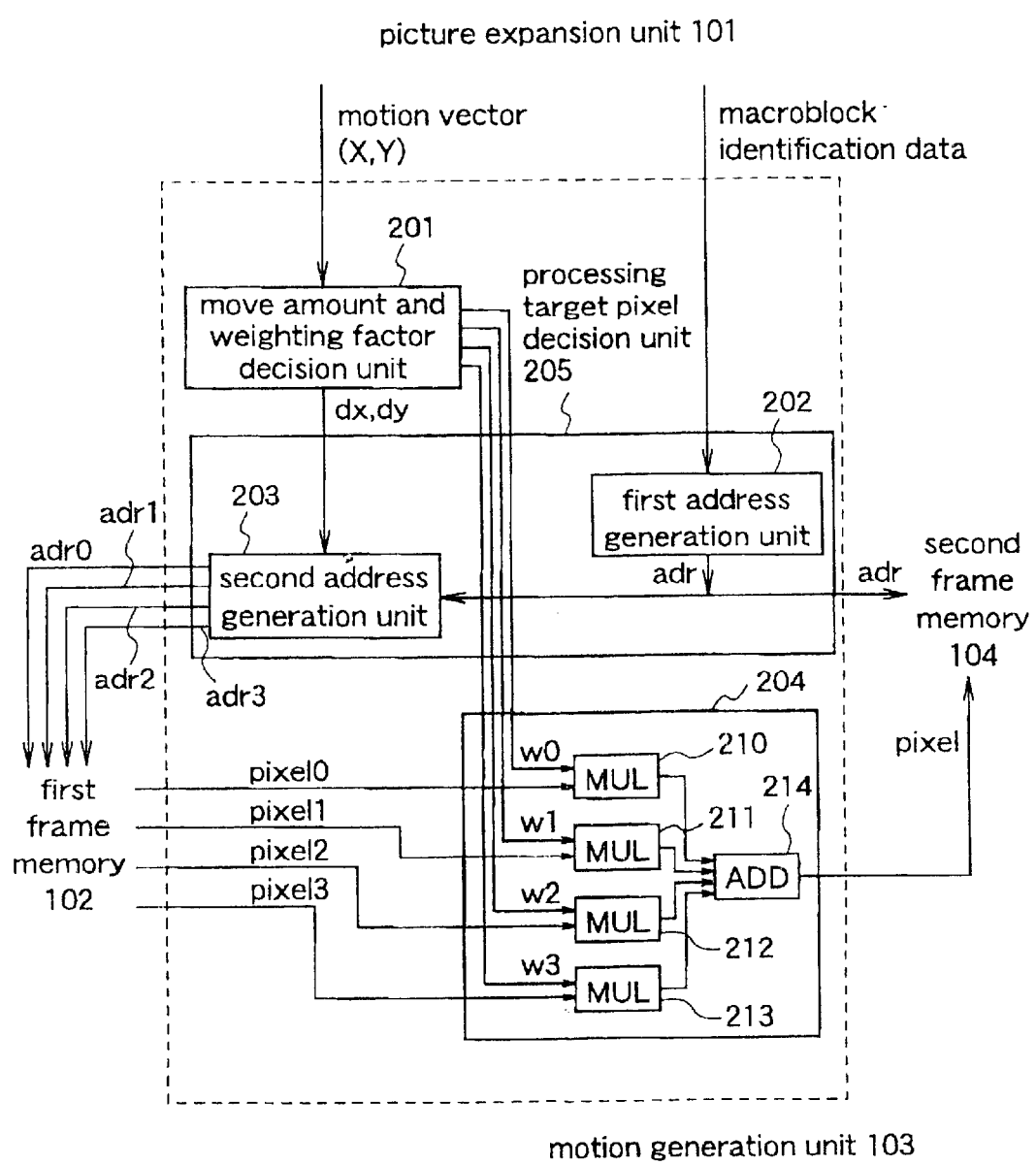
FIG. 2 is a diagram for explaining an internal structure and function of a motion generation unit included in the apparatus of the first embodiment.

FIG. 2 is a block diagram illustrating an internal structure of the motion generation unit 103 shown in FIG. 1. As shown in the figure, the motion generation unit 103 comprises a move amount and weighting factor decision unit 201, a first address generation unit 202 and a second address generation unit 203 which address generation units function as a processing target pixel decision unit 205, and a weighted addition unit 204. The weighted addition unit 204 comprises a first multiplier 210, a second multiplier 211, a third multiplier 212, a fourth multiplier 213, and an adder 214.

A motion vector (X,Y) as change information, and macroblock identification data corresponding to the motion vector are input to the motion generation unit 103 from the picture expansion unit 101 (FIG. 1).

The move amount and weighting factor decision unit 210 receives the motion vector as an input, and generates a move amount (dx,dy) and weighting factors (w0–w3) for each pixel as a processing target included in the expanded picture data, on the basis of this motion vector, to be used for a motion generation processing. The first address generation unit 202 receives the macroblock identification data as an input, and generates a storage address (adr) for each pixel on the basis of the macroblock identification data, to be used when the picture data is stored in the second frame memory 104. The second address generation unit 203 receives the storage address generated by the first address generation unit 202 and the move amount (dx,dy) generated by the move amount and weighting factor decision unit 201 as inputs, and generates storage addresses (adr0–adr3) of four pixels on the basis of the storage address and the move amount, to be used when the picture data is read out from the first frame memory 102.

The weighted addition unit 204 receives the weighting factors (w0–w3) generated by the move amount and weighting factor decision unit 201 as inputs, and subjects pixel data (pixel0 to pixel3) of four pixels which are read from the first frame memory 102 using the addresses generated by the second address generation unit 203, to the weighted addition processing. The weighted addition processing comprises weighting processings of multiplying the pixel data by weight amounts by the first to fourth multipliers 210 to 213 included in the weighted addition unit 204, and an addition processing for four weighted results obtained by the multiplication processings by the adder 214.

FIGS. 3 to 7 are diagrams for explaining processings by the picture processing apparatus of the first embodiment. Hereinafter, a description is given of an operation of the picture processing apparatus of the first embodiment in processing picture data which is input from a storage medium or the like, with using FIGS. 3 to 7 with reference to FIGS. 1 and 2.

Coded picture data is input from a storage medium to the picture expansion unit 101 included in the picture processing apparatus of the first embodiment. In this case, assume that the coded picture data is coded according to MPEG1 or MPEG2 as the common compressive coding standards. In this coding, the compressive coding is performed taking a macroblock comprising plural pixels as a processing unit, and the intra-frame coding is performed on the basis of the correlation within one frame (one screen) of digital picture data, i.e. spatial correlation as well as the inter-frame coding is performed on the basis of the correlation between frames adjacent in the time series of digital picture data, i.e. temporal correlation, thereby obtaining a high compressibility.

In the intra-frame coding, a pixel itself is a processing target. On the other hand, in the inter-frame coding, the amount of motion between the frames adjacent in the time series is detected for a macroblock as a processing target (unit pixel region), to generate a motion vector for indicating the motion, thereby realizing a high compressibility.

In accordance with processing procedures in the common compressive coding, one macroblock comprises six pixel blocks (consisting of prescribed pixels such as 8×8 pixels) and four of the six pixel blocks constituting the macroblock show luminance signals and two of them show color difference signals. Hereinafter, only a processing for the luminance signals as processing targets in the picture processing apparatus of the first embodiment will be described with reference to FIG. 3. However, the color difference signals are processed in a similar way.

Figure 3:
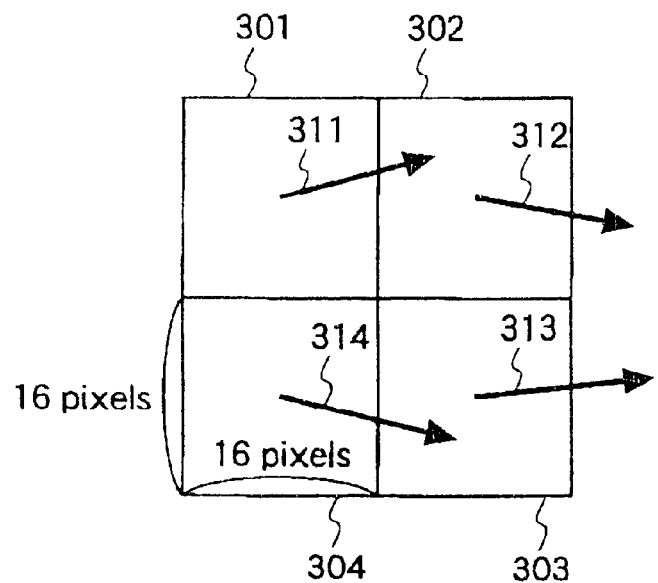
FIG. 3 is a diagram for explaining macroblocks constituting picture data which is to be processed by the apparatus of the first embodiment, and motion vectors.

FIG. 3 is a diagram for explaining expanded picture data which will be stored in the first frame memory 102 in the picture processing apparatus of the first embodiment, and motion vectors. Here, these motion vectors show directions of motions predicted in the reproduction in the forward direction. The same shall apply hereinafter unless otherwise specified.

FIG. 3 is a conceptional diagram illustrating part of the expanded picture data stored in the first frame memory 102. This figure shows that four macroblocks, i.e. first to fourth macroblocks 301 to 304 are stored in the first frame memory 102. Each of the macroblocks comprises 16×16 pixels.

A motion vector detected between a macroblock and an adjacent macroblock in the time series is added to each of these macroblocks. Reference numerals 311 to 314 in FIG. 3 denote motion vectors which are added to the first to fourth macroblocks 301 to 304, respectively. In the first embodiment, the motion vectors 311 to 314 which are added to the first to fourth macroblocks 301 to 304 are extracted in the expansion processing by the picture expansion unit 101 (FIG. 1), and input to the move amount and weighting factor decision unit 201 (FIG. 2) included in the motion generation unit 103, from the picture expansion unit 101.

Here, numerals 311 to 314 in FIG. 3 are vectors showing the directions of motions from the centers of the respective macroblocks 301 to 304, for convenience, sake. In addition, these motion vectors 311 to 314 are vectors for the reproduction time direction. Accordingly, the respective macroblocks 301 to 304 are predicted to show motions in the directions of the respective motion vectors 311 to 314, with the lapse of time.

The motion generation unit 103 shown in FIG. 1 subjects the macroblocks 301 to 304 in FIG. 3 (stored in the first frame memory 102) to the weighted addition processing for pixels included in the respective macroblocks, on the basis of the motion vectors 311 to 314 shown in FIG. 3, and stores the macroblocks in the second frame memory 104 (FIG. 1).

Figure 4:
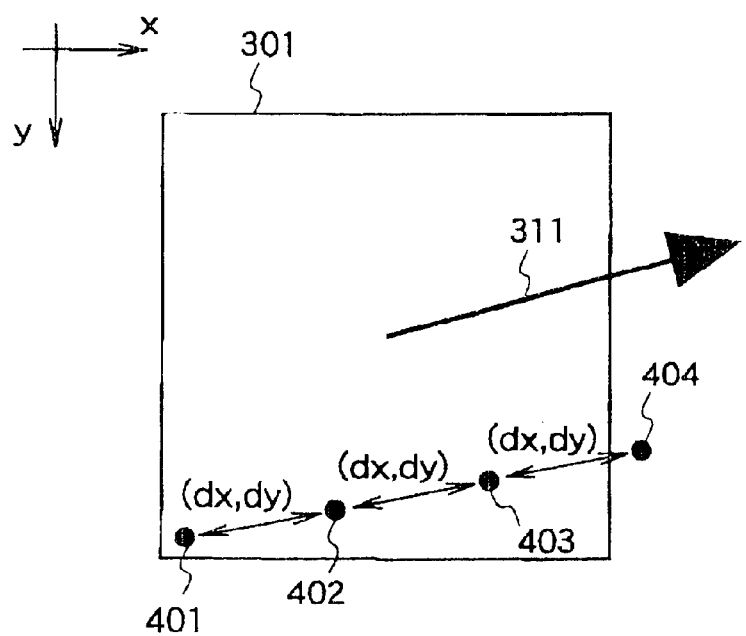
FIG. 4 is a diagram for explaining a motion generation and addition processing by the motion generation unit included in the apparatus of the first embodiment.
Figure 5:
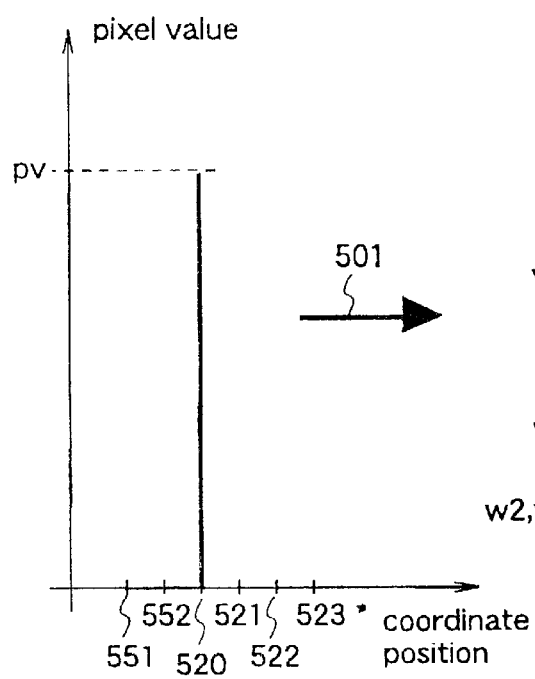
FIGS. 5(a)–5(d) are diagrams for explaining a weighted addition processing by the motion generation unit included in the apparatus of the first embodiment.
Figure 5:
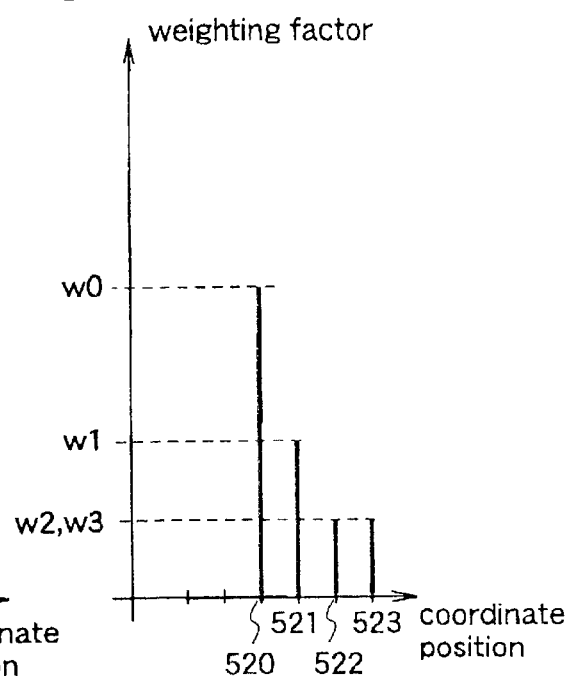
Figure 5:
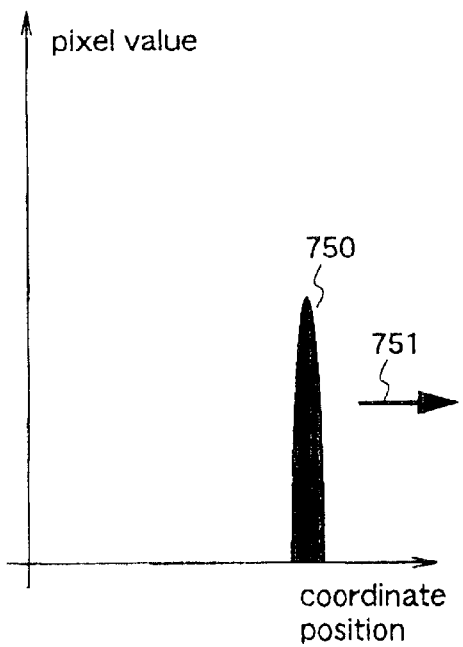
Figure 5:
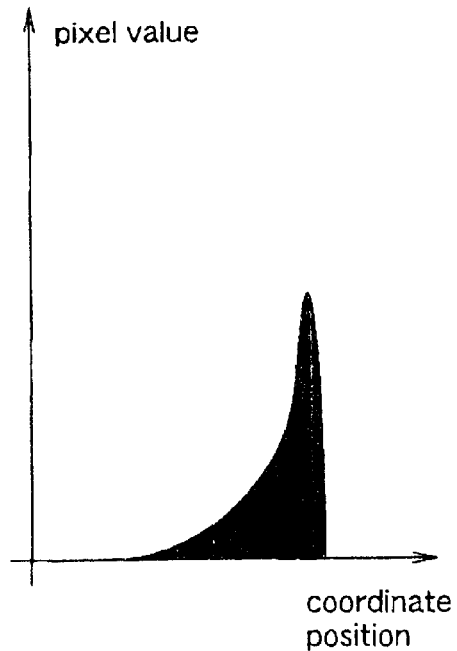

FIG. 4 is a diagram for explaining a method of deciding a pixel which is used in the weighted addition processing in the motion generation unit 103. The macroblock 301 and the motion vector 331 shown in FIG. 4 are the same as those shown in FIG. 3. The macroblock 301 is predicted to move in the direction indicated by the motion vector 311. In FIG. 4, numeral 401 denotes a reference pixel and numerals 402 to 404 denote first to third moving pixels. The reference pixel 401 is a pixel as a processing target in the weighted addition processing, and an arbitrary pixel in the region of the macroblock 301 can be selected as the reference pixel. The position of the reference pixel is shown by a coordinate position (x0,y0). This coordinate position is designated by an address generated by the first address generation unit 202 as described later.

As described with reference to FIG. 2, in the motion generation unit 103, the move amount and weighting factor decision unit 201 generates the move amount (dx,dy) which is used for deciding a moving pixel, by using the motion vector (X,Y). The move amount and weighting factor decision unit 201 in the first embodiment generates the move amount by using an arbitrary number k with the following expression:

$$(dx,dy)=(X,Y)*k$$

As shown in FIG. 2, the move amount generated by the move amount and weighting factor decision unit 201 is output to the second address generation unit 203.

On the other hand, also shown in FIG. 2, the macroblock identification data corresponding to the motion vector is input from the picture expansion unit 101 to the first address generation unit 202. In the first address generation unit 202, the storage address (adr) of the reference pixel 401 for indicating a storage position of the reference pixel 401 in the first frame memory 102 is generated on the basis of this macroblock identification data. The storage address is output to the second address generation unit 203 as well as used for designating the storage position in the second frame memory 104.

The second address generation unit 203 generates the storage addresses (adr1 to adr3) of three pixels for designating storage positions of the first to third moving pixels, on the basis of the storage address (adr) of the reference pixel, which is input from the first address generation unit 202, and the move amount input from the move amount and weighting factor decision unit 201. These storage addresses and adr0 (equal to adr) indicating the storage position of the reference pixel are storage addresses (adr) for indicating the storage positions of the four pixels which are used in the processing.

Decision of the moving pixels in the motion generation unit 103 is performed in the following way as shown in FIG. 4. Initially, a first moving pixel 402 is decided as a pixel which is in a position shifted from the coordinate position of the reference pixel 401 by an amount indicated by the move amount. That is, the coordinate position of the first moving pixel 402 is decided from the coordinate position (x0,y0) of the reference pixel 401 and the move amount (dx,dy) with the following expression:

$$(x1,y1)=(x0,y0)+(dx,dy)*1$$

Similarly, the second and third moving pixels 403 and 404 are decided by using the move amount (dx,dy) with the following expressions, assuming that their coordinate positions of the second and third moving pixels are (x2,y2) and (x3,y3), respectively:

$$(x2,y2)=(x0,y0)+(dx,dy)*2$$

$$(x3,y3)=(x0,y0)+(dx,dy)*3$$

The four storage addresses adr0 to adr3 generated by the second address generation unit 203 in FIG. 2 are (x0,y0), (x1,y1), (x2,y2), and (x3,y3), respectively. The motion generation unit 103 in FIG. 1 accesses the storage positions designated by these addresses from the expanded picture data stored in the first frame memory 102, whereby pixel values (pixel0 to pixel3) of the four pixels are obtained and input to the weighted addition unit 204 as shown in FIG. 2. Here, as shown in FIG. 4, the third moving pixel 404 exists outside the region of the macroblock. In this case, the pixel value of that pixel is obtained from another macroblock.

As shown in FIG. 2, in the motion generation unit 103, the move amount and weighting factor decision unit 201 decides the weighting factors (w0 to w3) for indicating contribution of the respective pixel data which is used in the processing, and outputs the weighting factors to the weighted addition unit 204. In this case, the move amount and weighting factor decision unit 201 generates ½, ¼, ⅛, and ⅛ as the weighting factors w0 to w3 for the reference pixel 401 (FIG. 4) and the first to third moving pixels 402 to 404, and outputs these weighting factors. The pixel values of the respective pixels (indicating the luminance of the respective pixels) are multiplied by the weighting factors w0 to w3, thereby being weighted. In the first embodiment, the total sum of these weighting factors is decided as 1, thereby avoiding changes in the luminance of the picture due to the processing.

In the weighted addition unit 204 shown in FIG. 2, the weighting factors W0 to W3 for the reference pixel 401 (FIG. 4) and the first to third moving pixels 402 to 404 are input to the contained first to fourth multipliers 210 to 213, respectively. In addition, the pixel values pixel0 to pixel3 of the reference pixel 401 and the first to third moving pixels 402 to 404 are input to the first to fourth multipliers 210 to 213, respectively. The first to fourth multipliers 210 to 213 multiply the input weighting factor and pixel value together, and outputs an obtained multiplied result to the adder 214, respectively. The adder 214 adds the four multiplied results, whereby a pixel value (pixel) which was subjected to the motion generation and addition processing is generated and output to the second frame memory 104 (FIG. 1).

As described above, the address (adr) generated by the first address generation unit 202 (FIG. 2) in the motion generation unit 103 is also used for designating the storage position in the second frame memory 104. Therefore, the processed pixel value (pixel) is stored in this storage position (adr), i.e. in the storage position corresponding to the storage position of the reference pixel 401 (FIG. 4) in the first frame memory 102.

When the above processing is performed taking all pixels included in the macroblock 301 shown in FIG. 3 as reference pixels, processed pixels corresponding to all the pixels included in the macroblock 301 are stored in the second frame memory 104 (FIG. 1). Further, the same processing is also performed for other macroblocks 302 or the like shown in FIG. 3, whereby data corresponding to all the picture data stored in the first frame memory 102, which was subjected to the motion generation and addition processing is stored in the second frame memory 104. The picture data stored in the second frame memory 104 is displayed or the like as an apparatus output of the picture processing apparatus. When any apparatus input is successively input to the picture processing apparatus from the storage medium or the like, the processings subsequent to the processing of the picture expansion unit 101 are repeated.

Figure 6:
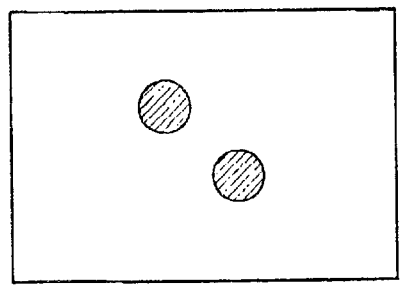
FIGS. 6(a) and 6(b) are diagrams for explaining a displayed state of picture data which is subjected to the motion generation and addition processing by the apparatus of the first embodiment.
Figure 6:
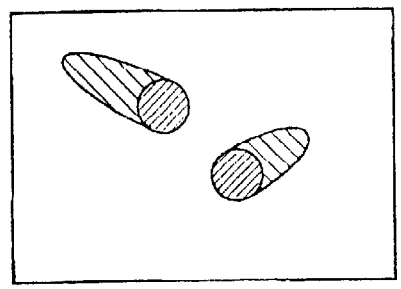

FIGS. 5(a)–5(d) are diagrams for explaining the motion generation and addition processing performed as above in the picture processing apparatus of the first embodiment. FIGS. 6(a) and 6(b) are conceptional diagrams showing effects produced by this processing. The motion generation and addition processing in the first embodiment will be further described with reference to FIGS. 5 and 6.

In FIGS. 5(a)–5(d), the coordinate position (shown in two dimensions) in FIG. 4 is shown by the one-dimensional abscissa to simplify the description of the weighted addition processing, and the pixel value is shown by the ordinate. FIG. 5(a) shows a state before performing the weighted addition processing. A processing target pixel having a coordinate position 520 (corresponding to the reference pixel 401 in FIG. 4) has a pixel vale "pv". All of pixels having coordinate positions 521 to 523 (corresponding to the moving pixels 402 to 404 in FIG. 4) have pixel values of "0". In addition, a vector 501 in the figure corresponds to the motion vector 311 in FIGS. 3 and 4, and it is a vector for indicating the direction of the motion in one dimension.

FIG. 5(b) shows the weighting factors w0 to w3 in FIG. 2. In the figure, the abscissa shows the one-dimensional coordinate position as that in FIG. 5(a) and the ordinate shows the value of the weighting factor. As shown in the figure, the pixels having the coordinate position 520 (corresponding to the reference pixel 401 in FIG. 4) and 521 to 523 (corresponding to the moving pixels 402 to 402 in FIG. 4) have the weighting factors ½, ¼, ⅛, and ⅛, respectively.

In the weighted addition processing, the pixel values of the pixels at the coordinate positions 520 to 523 shown in FIG. 5(a) are multiplied by the weighting factors for the coordinate positions 520 to 523 shown in FIG. 5(b), respectively, and the total sum of these multiplied results is a processed pixel value. This processing is executed for all the pixels shown by the abscissa in FIG. 5(a) by using the weighting factors in FIG. 5(b), whereby the motion generation and addition processing of the first embodiment is performed.

When the pixel 520 is used as the moving pixel in processing a pixel 551 or 552 in the figure, the pixel value pv of the pixel 520 is subjected to the predetermined weighting and then utilized. In a case where both of the pixels 551 and 552 have pixel values of "0" and the moving pixels 521 to 523 other than the pixel 520 have also pixel values of "0", when the pixel 520 is used as the second moving pixel in the processing with the pixel 551 as the reference pixel, the pixel 551 has a pixel value of pv/4. And when the pixel 520 is used as the first moving pixel in the processing with the pixel 552 as the reference pixel, the pixel 552 has a pixel value of pv/2.

FIGS. 5(c) and 5(d) are diagrams showing results of this motion generation and addition processing. In these figures, the abscissa shows the one-dimensional coordinate position and the ordinate shows the pixel value, as in FIG. 5(a). FIG.

5(c) shows a state where pixels having pixel values exist only in a narrow region shown by numeral 750. Numeral 751 denotes a vector for indicating the direction of motion, as in FIG. 5(a). In a state shown in FIG. 5(d), which is obtained by performing the weighted addition processing (motion generation and addition processing) for the state shown in FIG. 5(c), motion information is added in the direction indicated by the vector 751 compared with the state shown in FIG. 5(c).

FIGS. 6(a) and (b) are conceptional diagrams showing effects obtained when an apparatus output of the picture processing apparatus of the first embodiment is to be displayed. FIG. 6(a) shows a displayed state in a case where the motion generation and addition processing is not performed and FIG. 6(b) shows a displayed state in a case where the processing is performed. In FIG. 6(b) a displayed result which is equal to a case where a picture having a motion is integrated in a temporal direction is obtained. Therefore, when the motion generation and addition processing is performed by the picture processing apparatus of the first embodiment, a display having the sense of motion as shown in FIG. 6(b) is realized compared with the prior art picture processing apparatus which obtains only displays as shown in FIG. 6(a), whereby information about motions can be provided.

According to the first embodiment, the picture processing apparatus comprises the picture expansion unit 101, the first frame memory 102, the motion generation unit 103, and the second frame memory 104. And the motion generation unit 103 subjects the expanded picture data stored in the first frame memory 102 to the motion generation and addition processing by using the motion vector obtained from the picture expansion unit 101, and stores the picture data resulting from the processing in the second frame memory 104, whereby the picture to be displayed or the like as an apparatus output of the picture processing apparatus includes motion information and the displayed result having the sense of motion can be obtained. Therefore, displays having less disorder with relative to the prior art picture processing apparatus can be realized. And since the motion information is added, the users easily know the reproduction state. Further, also when the apparatus input to the picture processing apparatus of the first embodiment is picture data which is transmitted under a low bit rate environment by thinning out frames, the same effects can be obtained by performing the same processing.

In this first embodiment, the motion generation unit 103 decides the moving pixels for the reference pixel by performing the linear processing using the move amount as shown in FIG. 4, i.e. decides the moving pixels by multiplying the move amount by 1, 2, and 3. However, this is shown only as an example. The decision can be performed by the linear processing using numerical values other than 1, 2 and 3, or by a nonlinear processing. Also in this case, the same motion generation and addition processing is performed, thereby obtaining the above-described effects.

Figure 7:
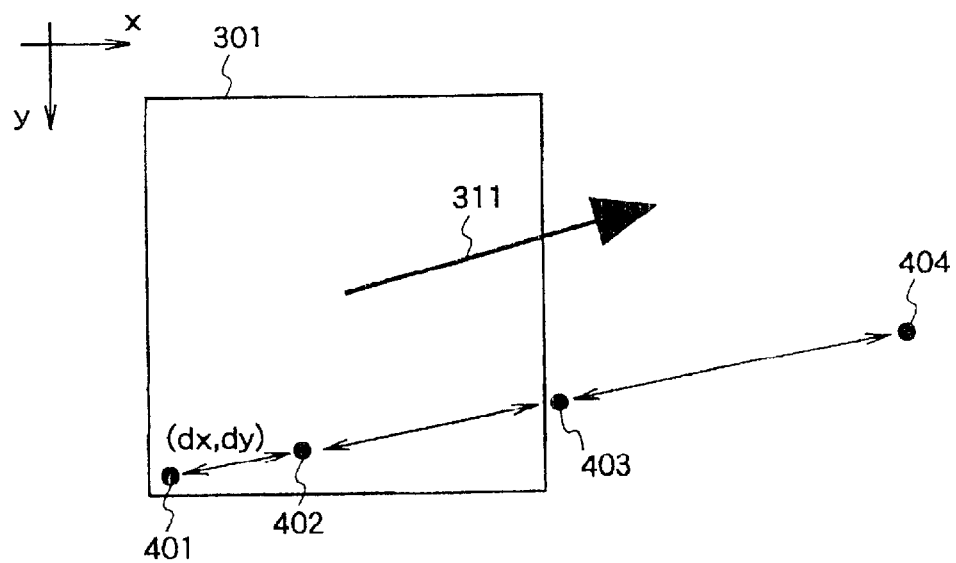
FIG. 7 is a diagram for explaining a processing when the motion generation and addition processing by the motion generation unit included in the apparatus of the first embodiment is performed as a nonlinear processing.

FIG. 7 is a diagram for explaining a case where the nonlinear processing is performed to decide the moving pixels. In the figure, the macroblock 301 and the motion vector 311 denote the same as those in FIGS. 3 and 4. In addition, the reference pixel 401 denotes a processing target pixel which is selected in a similar way to the first embodiment shown in FIG. 4.

In the case shown in FIG. 7, the first to third moving pixels 402 to 404 are designated by coordinate positions (x1',y1'), (x2',y2'), and (x3',y3'). And they are given by following expressions:

$(x1',y1')=(x0,y0)+(dx,dy)*1$ $(x2',y2')=(x0,y0)+(dx,dy)*4$ $(x3',y3')=(x0,y0)+(dx,dy)*8$

Also when the moving pixels decided by this nonlinear processing are used, the same motion generation and addition processing as that of the first embodiment can be performed.

In addition, in the first embodiment, the move amount and weighting factor decision unit 201 (FIG. 2) included in the motion generation unit 103 (FIG. 1) generates ½, ¼, ⅛, and ⅛ as the weighting factors w0 to w3 and outputs the weighting factors. However, these numerical values are also examples and the processing can be performed by setting other factors. Further, in this first embodiment, changes in the luminance are avoided by setting the total sum of the weighting factors to 1 (the same applies to the case of the color difference). However, when the luminance is changed in a case where special effects are to be obtained, factors whose total sum is not 1 can be utilized.

Embodiment 2

A picture processing apparatus according to a second embodiment of the present invention generates motion information on the basis of motion vectors and adds the motion information to picture data, like that of the first embodiment. However, the second embodiment is different from the first embodiment in that the apparatus of the second embodiment generates the motion information on the basis of a state of a picture shown by plural motion vectors and a reproduction state, and adds the motion information to the picture data.

Figure 8:
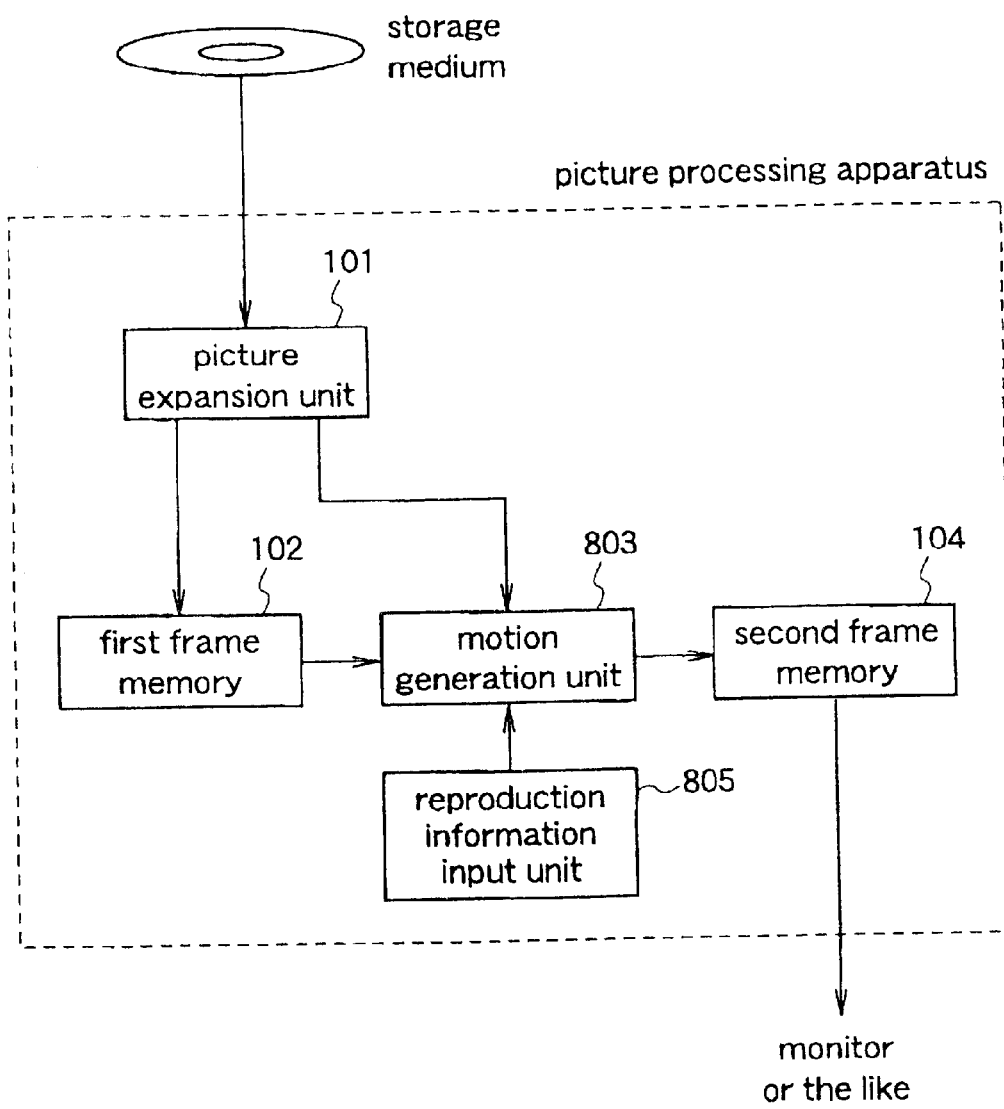
FIG. 8 is a block diagram illustrating a whole structure of a picture processing apparatus according to a second embodiment of the present invention.

FIG. 8 is a block diagram illustrating a whole structure of the picture processing apparatus of the second embodiment. As shown in the figure, the picture processing apparatus of the second embodiment comprises a picture expansion unit 101, a first frame memory 102, a motion generation unit 803, a second frame memory 104, and a reproduction information input unit 805. The structure of the second embodiment is obtained by adding the reproduction information input unit 805 to the whole structure of the picture processing apparatus of the first embodiment (FIG. 1). As similar to the picture processing apparatus of the first embodiment, the apparatus of the second embodiment receives compressively coded digital moving picture data from a storage medium such as a DVD as an apparatus input of the picture processing apparatus, and outputs displayed data as an apparatus output of the picture processing apparatus, to a displaying monitor or the like.

The reproduction information input unit 805 receives reproduction information which is used by the picture processing apparatus, from outside. In this case, the reproduction information is information for indicating a reproduction direction, a reproduction speed and the like. Here, the picture expansion unit 101, the first frame memory 102, and the second frame memory 104 are the same as those in the first embodiment. Accordingly, the same numerals as those in the first embodiment are given to these elements and they are not described here.

The motion generation unit 803 has an internal structure as shown in FIG. 2 as the motion generation unit 103 of the first embodiment and performs the motion generation and addition processing. However, in the motion generation unit 803 in the apparatus of the second embodiment, a structure and operation of a move amount and weighting factor decision unit 201 are different from those of the first embodiment.

Figure 9:
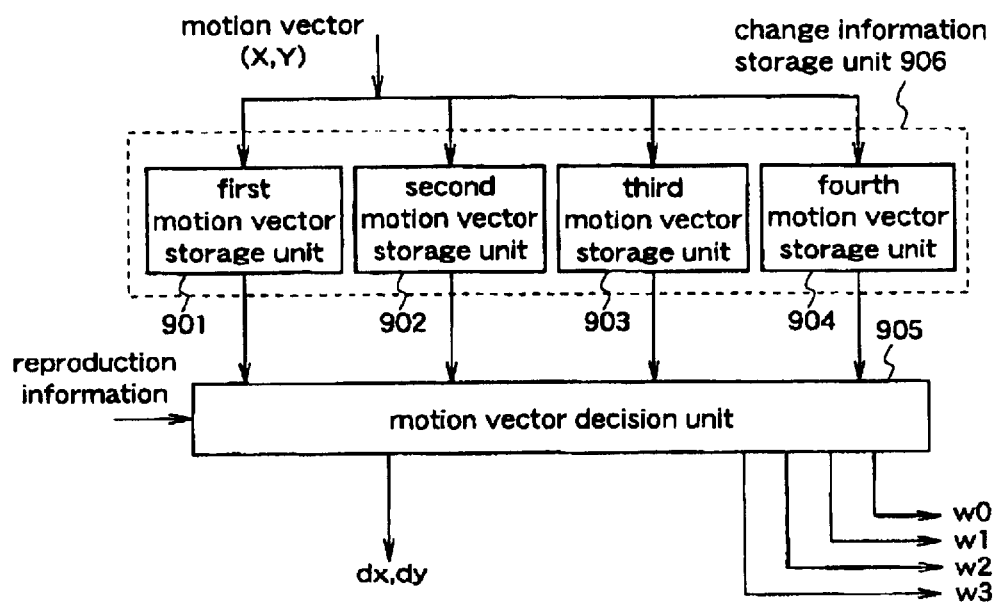
FIG. 9 is a diagram for explaining an internal structure and function of a motion generation unit included in the apparatus of the second embodiment.

FIG. 9 is a diagram illustrating an internal structure of the move amount and weighting factor decision unit 201 included in the picture processing apparatus of the second embodiment. As shown in the figure, the move amount and weighting factor decision unit 201 comprises first to fourth motion vector storage units 901 to 904 which function as a change information storage unit 906, and a motion vector decision unit 905. The first to fourth motion vector storage unit 901 to 904 functioning as the change information storage unit 906 store motion vectors as change information which is input from the picture expansion unit 101 (FIG. 8). The motion vectors of picture data which correspond to different times are stored in the first to fourth motion vector storage units 901 to 904.

The motion vector decision unit 905 obtains change information transition information for showing temporal changes of the motion vectors, from the motion vectors stored in the first to fourth motion vector storage units 901 to 904, in accordance with the reproduction information which is input from the reproduction information input unit 805 (FIG. 8), and generates a move amount and weighting factors on the basis of the obtained change information transition information. In the first embodiment, the processing is performed on the basis of the motion vector at a single time. On the other hand, in the second embodiment, the processing is performed on the basis of the plural motion vectors at different times.

Thus, in the second embodiment, the motion generation unit 803 generates displayed picture data on the basis of the change information transition information as temporal changes of the motion vectors, which are input as change information. In addition, the reproduction information input unit 805 is provided as reproduction information input means for inputting the reproduction information which designates a displayed state of the picture data, whereby the displayed picture data is generated in accordance with the reproduction information, as described later.

Figure 10:
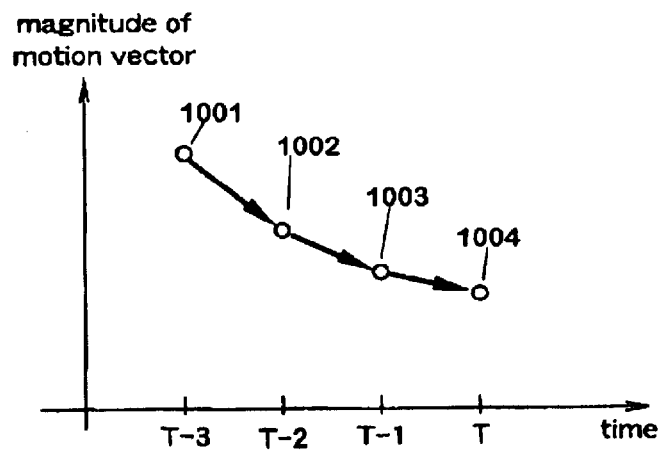
FIG. 10 is a diagram for explaining a change state (transition state) of a motion vector which is to be processed by the apparatus of the second embodiment.
Figure 11:
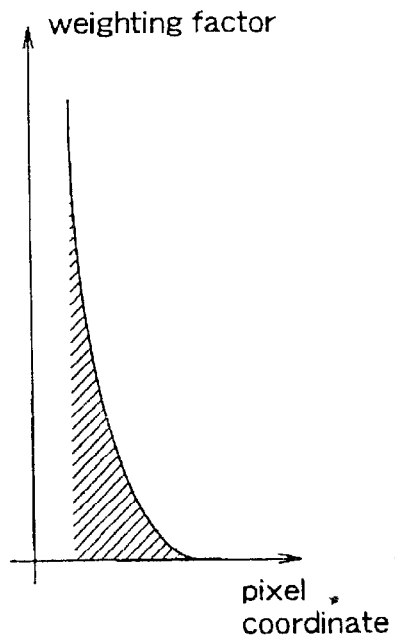
FIGS. 11(a)–11(d) are diagrams for explaining a weighted addition processing according to the magnitude and transition state of the motion vector, by the apparatus of the second embodiment.
Figure 11:
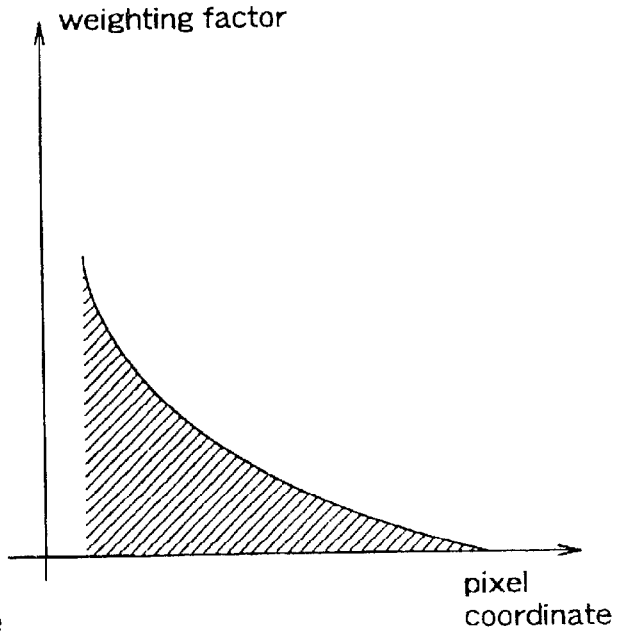
Figure 11:
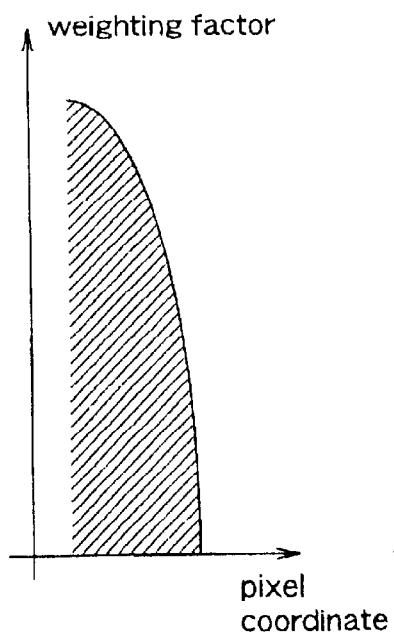
Figure 11:
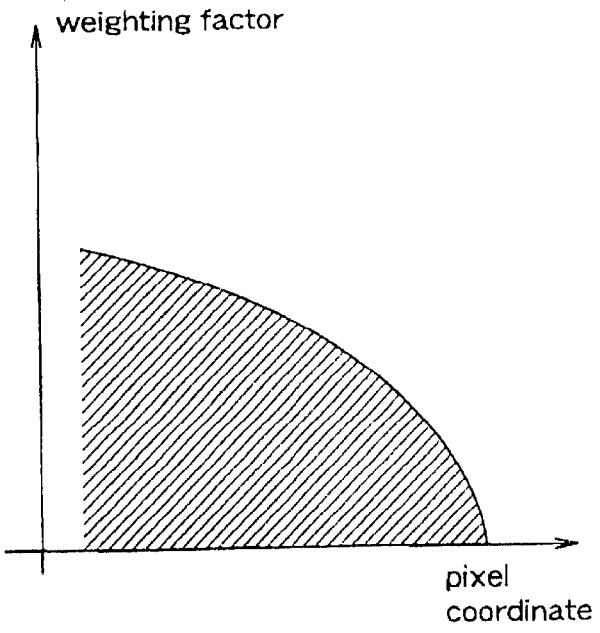
Figure 12:
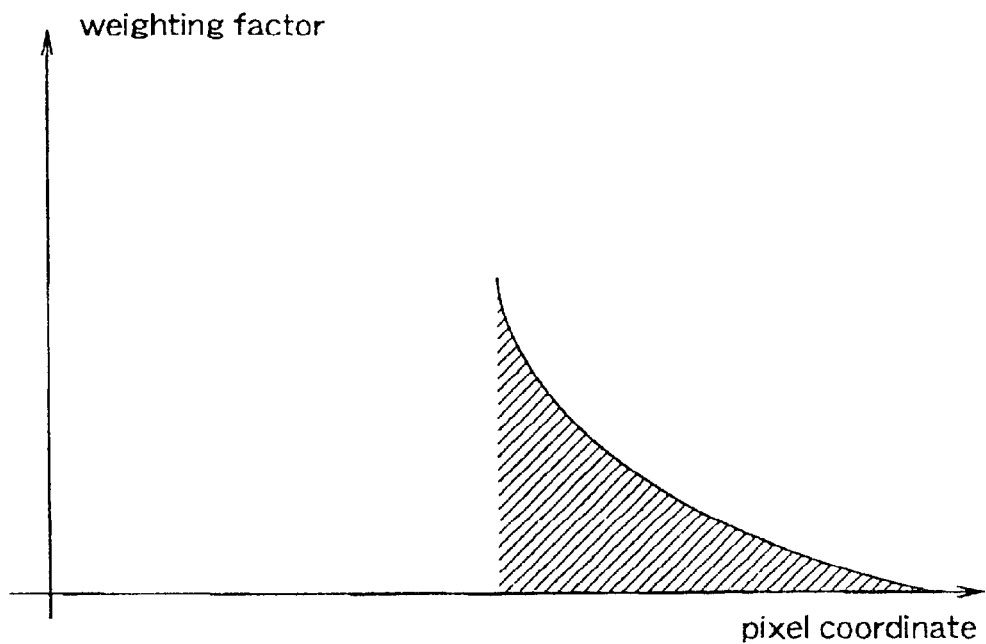
FIGS. 12(a) and 12(b) are diagrams for explaining a weighted addition processing according to information which indicates a reproduction direction, by the apparatus of the second embodiment.
Figure 12:
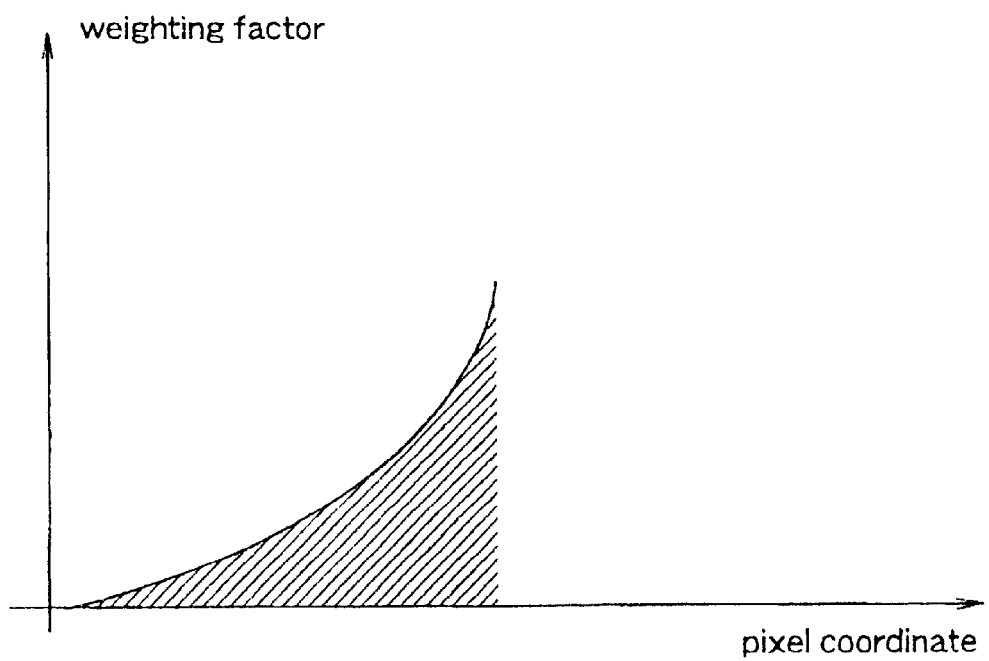

FIGS. 10 to 12 are diagrams for explaining the processing in the picture processing apparatus of the second embodiment. Hereinafter, an operation of the picture processing apparatus of the second embodiment when it processes the picture data input from the storage medium or the like will be described using FIGS. 10 to 12 with reference to FIGS. 8 and 9.

Coded picture data is input from the storage medium to the picture expansion unit 101 included in the picture processing apparatus of the second embodiment. Similarly to the first embodiment, the coded picture data is generated by the compressive coding processing including the common inter-frame processing and a motion vector is added to the coded picture data. The picture expansion unit 101 performs the expansive decoding processing as the reverse processing to the compressive coding processing, as the picture expansion unit 101 of the first embodiment, and outputs obtained expanded picture data to the first frame memory 102 and the motion vector to the motion generation unit 803.

The motion generation unit 803 stores the input motion vector in either of the motion vector storage units. When the picture expansion unit 101 processes any following coded data and outputs the motion vector to the motion generation unit 803, this motion vector is stored in either of the motion vector storage units other than the unit where the motion vector is stored in a previous step. Accordingly, the first to fourth motion vector storage units 901 to 904 included in the motion generation unit 803 store the motion vectors corresponding to picture data at different times. In this case, the first to fourth motion vector storage units store the motion vectors at times of (T-3), (T-2), (T-1), and T, respectively.

In this second embodiment, information for indicating changes of the motion vectors is obtained and motion information having a temporal width is added by storing the plural motion vectors at the different times. FIG. 10 is a diagram for explaining the changes of the motion vectors. In the figure, numerals 1001 to 1004 denote the motion vectors at times of (T-3), (T-2), (T-1), and T when paying attention to a specified macroblock. FIG. 10 shows temporal changes of the magnitudes (scalar values) of the motion vectors in the specified macroblock. These times are arranged in the order of the time series and the motion vectors have the transition state as shown in the figure.

In the motion generation unit 803 of the second embodiment, these four motion vectors are stored in the first to fourth motion vector storage units 901 to 904. Then, the motion vector decision unit 905 obtains change information transition information for indicating a change state of the motion vectors according to the time series, on the basis of the motion vectors stored in the first to fourth motion vector storage unit 901 to 904, and generates a move amount and weighting factors in accordance with the obtained change information transition information.

FIGS. 11(a) to 11(d) are diagrams for explaining the selection of the weighting factors in accordance with the change state of the motion vectors in the second embodiment. FIGS. 11(a) to 11(d) show relationships between the move amount and the weighting factor. In FIGS. 11(a) to 11(d), the abscissa shows the pixel coordinate (move amount) and the ordinate shows the value of the weighting factor. The motion vector decision unit 905 decides the weighting factor using a function which shows either of the relationships shown in FIGS. 11(a) to 11(d), according to the change state of the motion vectors. The decision is performed on the basis of the magnitude of the motion vector and the amount of change of the motion vectors.

When the motion vector is large, it means that motion of a processing target picture is large. Accordingly, when the motion information is generated, it is desirable to use pixels in a wider range in the weighted addition processing. Therefore, the decision is performed using a function which shows the relationship of FIG. 11(b) or 11(d) where the weighting factors are set for pixel coordinates in a wider range. On the other hand, when the motion vector is small, i.e. when the motion of a picture is small, it is desirable to use pixels in a relatively narrower range for the weighted addition processing in the generation of the motion information. Accordingly, the decision is performed using a function which indicates the relationship of FIG. 11(a) or 11(c) where the weighting factors are set for pixel coordinates in a relatively narrower range.

When the change of the motion vectors is slow, it is desirable that influences of pixels adjacent to the processing target (reference pixel) should be large.

Accordingly, the decision is performed using a function which indicates the relationship of FIG. 11(c) or 11(d) where adjacent pixels are subjected to the weighting. On the other hand, when the change in the motion vectors is rapid, it is desirable that also influences of pixels which are relatively far from the reference pixel should be considered. Accordingly, the decision is performed using a function which indicates the relationship of FIG. 11(a) or 11(b).

From the foregoing, when the motion vector is small and the change in the motion is hard, a function indicating the relationship of FIG. 11(a) is used. When the motion vector is large and the change in the motion is hard, a function indicating the relationship of FIG. 11(b) is used. When the motion vector is small and the change in the motion is gentle, a function indicating the relationship of FIG. 11(c) is used. And when the motion vector is large and the change in the motion is gentle, a function indicating the relationship of FIG. 11(d) is used. Accordingly, the weighted addition processing appropriately corresponding to the state of the picture can be performed.

In the picture processing apparatus of the second embodiment, the reproduction information indicating the reproduction speed and the reproduction direction, i.e. whether the forward reproduction or reverse reproduction is performed is input from the reproduction information input unit 805 shown in FIG. 8 to the move amount and weighting factor decision unit 201 (FIG. 2) included in the motion generation unit 803. In the move amount and weighting factor decision unit 201, this reproduction information is input to the motion vector decision unit 905 and used together with the information about the motion vector, for deciding of the move amount and the weighting factors.

Among the reproduction information, the information indicating the reproduction speed is handled in a similar way to the magnitude of the motion vector. That is, when the reproduction speed is large, like when the motion vector is large, the function indicating the relationship of FIG. 11(b) or 11(d) is used to utilize pixels in a wide range for the processing. On the other hand, when the reproduction speed is small, like when the motion vector is small, the function indicating the relationship of FIG. 11(a) or 11(c) is used to utilize pixels in a relatively narrow range for the processing.

Among the reproduction information, the information indicating the reproduction direction is used in a following way. Like FIG. 11, FIGS. 12(a) and (b) are diagrams for explaining the selection of the weighting factor according to the reproduction direction, and show relationships between the move amount and the weighting factor. The abscissa and the ordinate show the same as those in FIG. 11. When the forward reproduction, i.e. the reproduction according to the time series is performed, a function indicating a relationship as shown in FIG. 12(a) where the weighting factors are set in the forward direction (direction of motion) is used. On the other hand, when the reverse reproduction, i.e. the reproduction in the reverse direction to the time series is performed, a function indicating a relationship as shown in FIG. 12(b) where the weighting factors are set in the backward direction (the reverse direction to the motion) is used.

When the move amount and the weighting factors are generated in the move amount and weighting factor decision unit 201 (FIG. 2) by using the adaptively selected function, the following processings are executed in a similar way to the first embodiment, and picture data which was subjected to the motion generation and addition processing is stored in the second frame memory 104 (FIG. 8). Therefore, this picture data has the motion information as the first embodiment and thereby displayed result having the sense of motion can be obtained. Further, the added motion information is adapted to the state of the picture more than that of the first embodiment.

As described above, the picture processing apparatus of the second embodiment comprises the picture expansion unit 101, the first frame memory 102, the motion generation unit 803, the second frame memory 104, and the reproduction information input unit 805. And the motion generation unit 803 subjects the expanded picture data stored in the first frame memory 102 to the motion generation and addition processing by using the motion vectors obtained from the picture expansion unit: 101, and stores the picture data resulting from this processing, in the second frame memory 104. Therefore, the picture which is displayed or the like as an apparatus output of the picture processing apparatus includes the motion information and the displayed result having the sense of motion can be obtained. In addition, the move amount and weighting factor decision unit 201 included in the motion generation unit 803 comprises the first to fourth motion vector storage units 901 to 904 to store the motion vectors at different times, and comprises the motion vector decision unit 905 to decides the move amount and the weighting factors according to the state of the motion vectors and the reproduction information. Therefore, the motion information corresponding to the state of picture more appropriately can be added. Further, also when the picture data which is transmitted under a low bit rate environment by thinning out frames is input to the picture processing apparatus of the second embodiment as an apparatus input, the same processing can be performed, thereby obtaining the same effects.

In the second embodiment, the move amount and weighting factor decision unit 201 comprises the first to fourth motion vector storage units 901 to 904, and the motion vector decision unit 905 performs the processing on the basis of four motion vectors. However, the number of the motion vector storage units is not limited to four. The number of the motion vector storage units can be reduced to obtain the miniaturization of the circuit scale and the simplification of the processing. Or the number can be increased to realize a more appropriate processing.

Embodiment 3

A picture processing apparatus according to a third embodiment of the present invention generates motion information on the basis of motion vectors and adds the motion information to picture data, like the first embodiment. However, the third embodiment is different from the first embodiment in that the apparatus of the third embodiment generates motion information generated on the basis of a motion vector for each pixel to be a processing target and adds the motion information to the picture data.

A whole structure of the picture processing apparatus of the third embodiment is similar to that of the first embodiment and thus the description is given with reference to FIG. 1. Like the picture processing apparatus of the first embodiment, the picture processing apparatus of the third embodiment also comprises a motion generation unit 103 having an internal structure as shown in FIG. 2 and performs the motion generation and addition processing. However, the motion generation unit 103 in the apparatus of the third embodiment comprises a move amount and weighting factor decision unit 201, a first address generation unit 202 and a second address generation unit 203 which function as a processing target pixel decision unit 205, a weighted addition unit 204, and a motion vector interpolation unit 1301. Here, the move amount and weighting factor decision unit 201, the first address generation unit 202, the second address generation unit 203, and the weighted addition unit 204 are the same as those in the first embodiment. Accordingly, the same numerals as those in the first embodiment are given to these elements and they are not described here.

Figure 13:
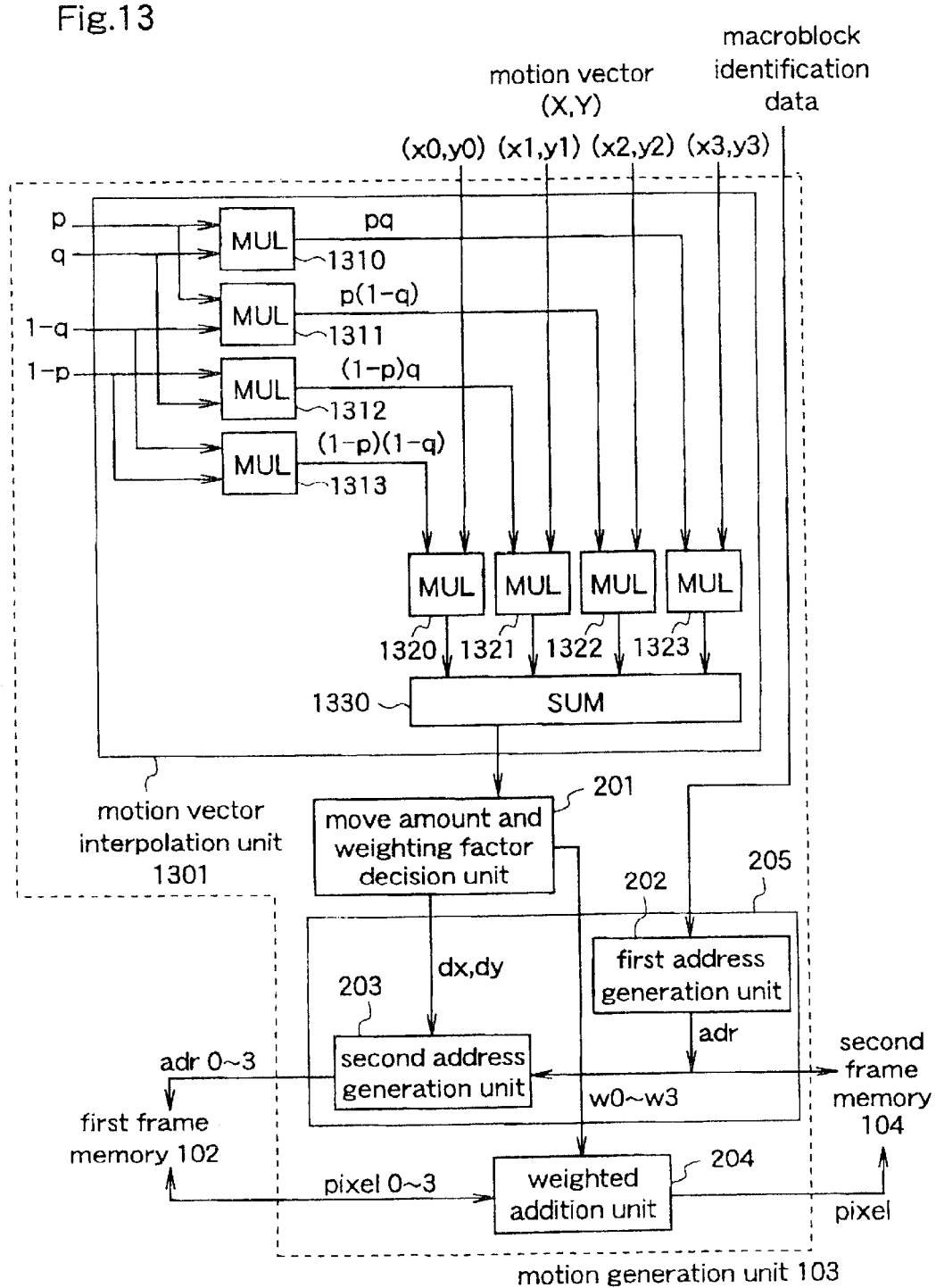
FIG. 13 is a diagram for explaining an internal structure and function of a motion generation unit included in a picture processing apparatus according to a third embodiment.

FIG. 13 is a diagram illustrating an internal structure of the motion generation unit 103 included in the picture processing apparatus of the third embodiment. As shown in the figure, the motion vector interpolation unit 1301 comprises first to fourth multipliers 1310 to 1313, fifth to eighth multipliers 1320 to 1323, and an adder 1330. Here, the fifth to eighth multipliers 1320 to 1323 and the adder 1330, which are included in the motion vector interpolation unit 1301, are multipliers and adder for the vector operation, and they can perform two sets of multiplication processings and two sets of addition processings, respectively.

The motion vector interpolation unit 1301 performs an interpolation processing on the basis of four motion vectors and four pieces of position information, and generates a motion vector corresponding to processing unit picture data as a processing target. In this case, in the interpolation processing according to the third embodiment described below, the processing unit picture data is pixel data and a motion vector corresponding to a pixel as the processing target is generated.

That is, the motion generation unit 103 included in the picture processing apparatus of the third embodiment generates a motion vector for each pixel, as unit change information corresponding to the pixel as the processing unit picture data, which is to be a processing target, on the basis of plural motion vectors which are input as change information, and generates displayed picture data on the basis of the generated motion vector.

Figure 14:
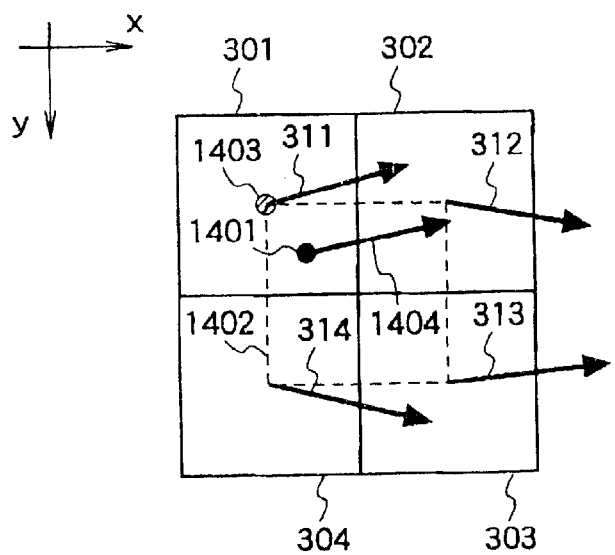
FIG. 14 is a diagram for explaining a motion vector interpolation processing by a vector interpolation unit included in the apparatus of the third embodiment.
Figure 14:
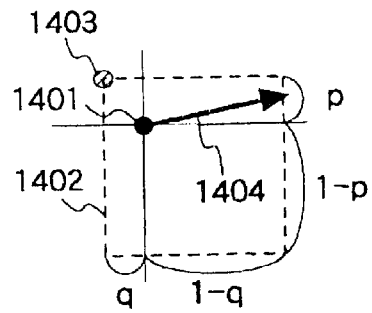
Figure 15:
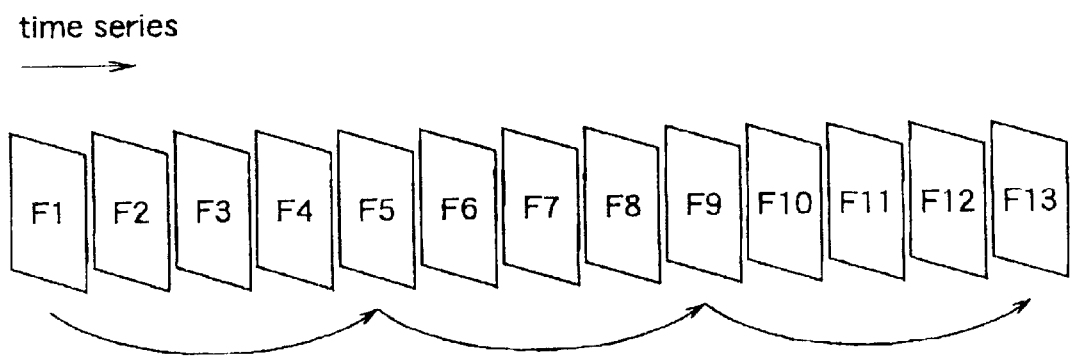
FIG. 15 is a diagram for explaining frames of picture data and a high-speed reproduction processing.

FIGS. 14(*a*) and (*b*) are diagrams for explaining the processing by the motion vector interpolation unit 1301 of the third embodiment. FIG. 14(*a*) is a diagram illustrating expanded picture data stored in the first frame memory 102 (FIG. 1) and motion vectors in the picture data, like FIG. 3. Numerals 301 to 304 denote macroblocks, each consisting of 16×16 pixels, like FIG. 3. Numerals 311 to 314 denote vectors, each indicating a direction of motion from the center of each of the macroblocks 301 to 304, like FIG. 3. Numeral 1401 in FIG. 14(*a*) denotes an interpolation target pixel and this is a processing target pixel whose motion vector is generated by the interpolation processing. Numeral 1402 denotes a region obtained by connecting the centers of the respective macroblocks 301 to 304 with each other, which region including the interpolation target pixel 1401, and this is an interpolation region which is used in the interpolation processing. Numeral 1403 denotes an interpolation reference pixel as a reference point which is set in the interpolation region 1402. In this case, a pixel which is closest to the origin shown in FIG. 14(*a*) in the interpolation region is set as the reference pixel. Numeral 1404 denotes a motion vector which is generated for the interpolation target pixel by the interpolation processing.

FIG. 14(*b*) is a diagram for explaining pixel position information which indicates a positional relationship between the interpolation target pixel 1401 and the interpolation reference pixel 1403 in the interpolation region 1402. Here, assume that the coordinates of the interpolation target pixel 1401 are (x,y) and the coordinates of the interpolation reference pixel 1403 are (x0,y0). Pixel position information (p,q, 1−p,1−q) shown in FIG. 14(*b*) is given by the following expressions:

$p=(x-x0)/16$ $q=(y-y0)/16$ $1-p=1-(x-x0)/16$ $1-q=1-(y-y0)/16$

The motion vector interpolation unit 1301 of the third embodiment performs the interpolation processing of generating the motion vector 1404 for the interpolation target pixel 1403, from the motion vector 311 of the macroblock and the motion vectors 312 to 314 of the adjacent macroblocks on the basis of the pixel position information.

Assuming that the motion vectors 311 to 314 are (X0,Y0), (X1,Y1), (X2,Y2), and (X3,Y3), the motion vector 1404 (X,Y) for the interpolation target pixel 1403 is given by the following expression:

$(X,Y)=(1-p)*(1-q)*(X0,Y0)$ $+(1-p)*q*(X3,Y3)$ $+p*(1-q)*(X1,Y1)$ $+p*q*(X2,Y2)$

Therefore, the motion vector interpolation unit 1301 performs the above operation by the first to fourth multipliers 1310 to 1313, the fifth to eighth multipliers 1320 to 1323, and the adder 1330, thereby to generate the motion vector 1404 (X,Y).

Initially, respective terms, i.e. p, q, 1−p, and 1−q constituting the pixel position information (p, q, 1−p, 1−q) are input to the first to fourth multipliers 131.0 to 1313 in the motion vector interpolation unit 1310, respectively, as shown in FIG. 13. More specifically, the first term p is input to the first and second multipliers 1310 and 1311, the second term q is input to the first and third multipliers 1310 and 1312, the third term 1−p is input to the third and fourth multipliers 1312 and 1313, and the fourth term 1−q is input to the second and fourth multipliers 1311 and 1313. Then, the respective multipliers multiply the respective input terms together. Accordingly, the first to fourth multipliers 1310 to 1313 generate p*q, p*(1−q), (1−p)*q, (1−p)*(1−q), respectively. The first to fourth multipliers 1310 to 1313 output these multiplied results to the fifth to eighth multipliers 1320 to 1323, as shown in FIG. 13. Therefore, the multiplied result (1−p)*(1−q) is input to the fifth multiplier 1320, the multiplied result (1−p)*q is input to the sixth multiplier 1321, the multiplied result p*(1−q) is input to the seventh multiplier 1322, and the multiplied result p*q is input to the eighth multiplier 1323.

On the other hand, the motion vectors 311 to 314 are input to the motion vector interpolation unit 1301 and these motion vectors are input to the fifth to eighth multipliers 1320 to 1323, respectively, as shown in FIG. 13. That is, the motion vector 311 (X0,Y0) is input to the fifth multiplier 1320, the motion vector 312 (X1,Y1) is input to the sixth multiplier 1321, the motion vector 313 (X2,Y2) is input to the seventh multiplier 1322, and the motion vector 314 (X3,Y3) is input to the eighth multiplier 1323.

Since the fifth to eight multipliers 1320 to 1323 are multipliers for the vector operation as described above, they perform two sets of multiplication processings of the input multiplied result and the motion vectors, respectively. For example, the fifth multiplier 1320 performs the multiplication processing of (1−p)*(1−q)*X0 and the multiplication processing of (1−p)*(1−q)*Y0. Therefore, the first to fourth terms of the above operation expression for generating the motion vector 1404 (X,Y) are generated by the vector multiplication processings in the fifth to eighth multipliers 1320 to 1323, respectively. The fifth to eighth multipliers 1320 to 1323 output the generated multiplied results to the adder 1330, respectively. As described above, the adder 1330 is the adder for the vector operation and it executes two sets of addition processings. Therefore, these multiplied results are added by the adder 1330, whereby the motion vector (X,Y) is generated and output to the move amount and weighting factor decision unit 201, as shown in FIG. 13.

When the motion vector 1404 for the pixel as processing unit picture data, i.e. the interpolation target pixel 1401 shown in FIG. 14 is output to the move amount and weighting factor decision unit 201, the move amount and weighting factor decision unit 201 generates a move amount and weighting factors on the basis of the motion vector. The subsequent processings are executed in a similar way to the first embodiment. That is, the motion information is generated and the picture data having the motion information added thereto is stored in the second frame memory 104 (FIG. 1) and displayed or the like as an apparatus output of the picture processing apparatus.

In the compressive coding method according to MPEG1 or MPEG2, the motion vector is usually added to each macroblock or the like, as shown in the first or third embodiment. Or, in the object coding for performing the coding for each object, the motion vector is sometimes added taking the object as a unit. However, the coding method of generating coded data in which the motion vector is added for each pixel is unusual. Therefore, in the first embodiment, when pixels included in a macroblock are to be processed, the motion generation and addition processing is performed by using the motion vector which is added to this macroblock. However, in this third embodiment, the motion vector is generated for each pixel by using the motion vector added taking a macroblock as a unit, and the motion generation and addition processing is performed on the basis of the motion vector. Therefore, while the processing burden is increased, the motion information having a higher precision can be added.

As described above, the picture processing apparatus of the third embodiment comprises the picture expansion unit 101, the first frame memory 102, the motion generation unit 103, the second frame memory 104, and the reproduction information input unit 105. And the motion generation unit 103 subjects the expanded picture data stored in the first frame memory 102 to the motion generation and addition processing using the motion vectors obtained from the picture expansion unit 101, and stores the picture data resulting from the processing, in the second frame memory 104. Therefore, the picture which is displayed or the like as an apparatus output of the picture processing apparatus includes the motion information, and thereby the displayed result having the sense of motion can be obtained. In addition, the move amount and weighting factor decision unit 201 included in the motion generation unit 103 comprises the motion vector interpolation unit 1301, thereby to generate the motion vector for each pixel by the interpolation processing, and decides the move amount and the weighting factors on the basis of the generated motion vector. Therefore, the motion information corresponding to the state of picture more appropriately can be added. Further, also when the picture data which is transmitted under a low bit rate environment by thinning out is input to the apparatus of the third embodiment as an apparatus input, the same processing is performed, thereby obtaining the same effects.

In this third embodiment, as described with reference to FIG. 14, the motion vector is generated by the interpolation processing by using the motion vectors which are added to the four macroblocks. However, the number of the macroblocks is not limited to four. For example, the motion vectors which are added to nine or sixteen macroblocks can be used, thereby further improving the precision.

In the third embodiment, plural (four) motion vectors are subjected to the linear processing, thereby generating a motion vector for each pixel. However, the motion vectors can be subjected to a nonlinear interpolation processing. For example, when the motion vectors added to many macroblocks as in the above case are utilized, part of the motion vectors are multiplied by a set factor in the motion vector interpolation unit 1301, whereby the contribution of the motion vectors of adjacent macroblocks can be increased.

In the third embodiment, the apparatus performs the processing by obtaining a motion vector for each pixel, taking the processing unit picture data as the pixel data. However, the processing can be performed by obtaining the motion vector for each processing unit picture data which is a smaller unit than the picture data having the motion vector added thereto. For example, when the motion vector is added to each object, the apparatus can obtains the motion vector for each of macroblocks constituting the object, thereby to generate the motion information by using the obtained motion vector.

Further, in the third embodiment, the apparatus performs the processing by obtaining the motion vector for each processing unit picture data as a smaller unit than the picture data having the motion vector added thereto. However, the apparatus can perform the processing by obtaining a motion vector of processing unit picture data which is a larger unit than the picture data having the motion vector added thereto, by the reverse interpolation. In this case, while the precision of the motion information is deteriorated, the processing burden of the motion generation unit 103 can be reduced.

Embodiment 4

A picture processing apparatus according to a fourth embodiment generates motion information on the basis of motion vectors and adds the motion information to picture data, as the first embodiment. However, the fourth embodiment is different from the first embodiment in that the picture processing apparatus of the fourth embodiment compares a value of the motion vector for each macroblock with a threshold, generates the motion information on the basis of the comparison result, and adds the information to the picture data.

Figure 16:
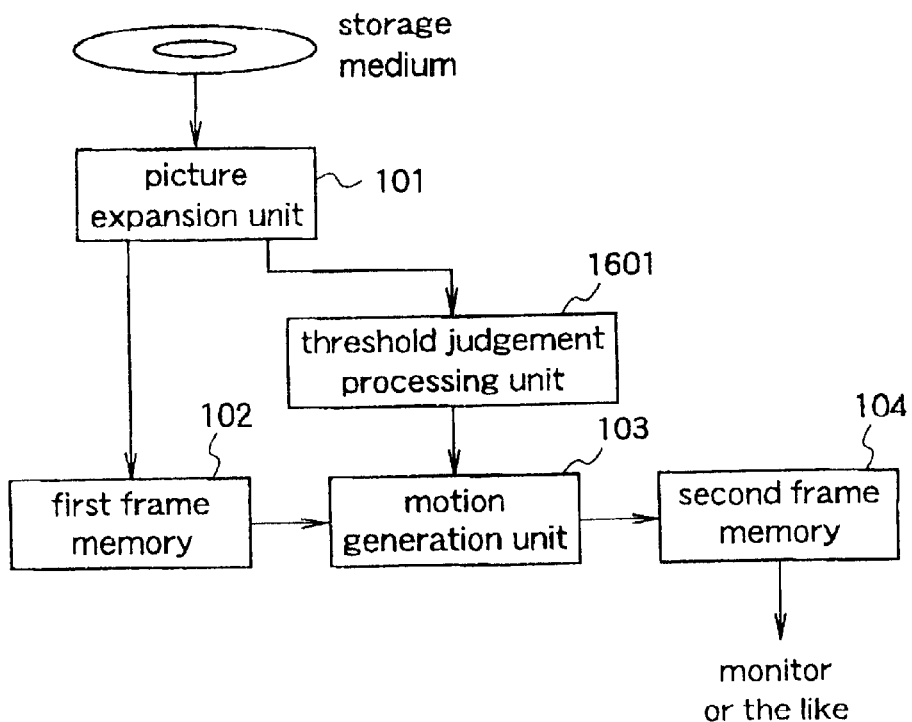
FIG. 16 is a block diagram illustrating a whole structure of a picture processing apparatus according to a fourth embodiment of the present invention.

FIG. 16 is a block diagram illustrating a whole structure of the picture processing apparatus of the fourth embodiment. As shown in the figure, the picture processing apparatus of the fourth embodiment comprises a picture expansion unit 101, a first frame memory 102, a motion generation unit 103, a second frame memory 104, and a threshold judgement processing unit 1601. The structure of the apparatus of the fourth embodiment is obtained by adding the threshold judgement processing unit 1601 to the whole structure of the picture processing apparatus of the first embodiment (FIG. 1). Here, the picture expansion unit 101, the first frame memory 102, the motion generation unit 103, and the second frame memory 104 in the picture processing apparatus of the fourth embodiment are the same as those in the first embodiment. Accordingly, the same numerals as those in the first embodiment are given to these elements and they are not described here.

The threshold judgement processing unit 1601 receives a motion vector (x,y) and macroblock identification data corresponding to this motion vector from the picture expansion unit 101 as an input, generates a second motion vector (x',y') for picture data which is generated by the motion generation unit 103 and macroblock identification data corresponding to this second motion vector, and outputs the second motion vector and the macroblock identification data to the motion generation unit 103.

That is, when the motion vector (x,y) is input from the picture expansion unit 101, the threshold judgement processing unit 1601 of the fourth embodiment compares the motion vector (x,y) with a predetermined threshold. At this time, when the motion vector (x,y) is the threshold or smaller, the threshold judgement processing unit judges that the target macroblock has no motion and outputs the second motion vector (x',y')=(0,0). On the other hand, when the motion vector (x,y) is larger than the threshold, it judges that the target macroblock has a motion and outputs the second motion vector (x',y')=(x,y).

Accordingly, the motion generation unit 103 generates a picture to which motion components are added, by using the second motion vector (x',y') output from the threshold judgement processing unit 1601, and outputs the picture to the second frame memory 104. Therefore, when a macroblock or object has a small motion vector, a picture having no motion component added thereto can be generated and output to the second frame memory 104. That is, when a picture stored in the storage medium includes camera shake, the risk that the picture including the camera shake is erroneously recognized as the motion of the picture is eliminated.

As described above, in the fourth embodiment, the threshold judgement processing unit 1602 is provided and thereby, when the magnitude of the motion vector is the threshold or smaller, the addition of the motion vector to the picture can be prevented. Therefore, in addition to the effects as those of the first embodiment, when the camera shake having a micro motion vector, or a picture or object having almost no motion vector is included, the motion information is not added. Thereby, the risk that the picture including the camera shake is erroneously recognized as the motion of the picture can be avoided.

Accordingly, unnecessary motion information is not given to the picture, thereby realizing a picture processing apparatus which can transmit the motion of an original picture and obtain a good picture including less disorder or displeasure.

In addition, when the second motion vector (x',y')=(0,0) is input to the motion generation unit 103, the motion generation unit 103 has no necessity of performing the weighted addition, whereby the pixel stored in the first frame memory 102 can be stored in the second frame memory 104 as it is. Therefore, the processing amount of the weighted addition unit 204 which performs the weighted addition in the motion generation unit 103 can be reduced, thereby increasing the processing speed.

The picture processing apparatus of the fourth embodiment has the structure which is obtained by adding the threshold judgement processing unit 1601 to the picture processing apparatus of the first embodiment. However, also a structure which is obtained by adding threshold judgement processing unit 1601 to the picture processing apparatus of the second or third embodiment can obtain the same effects as those described above.

The threshold judgement processing unit 1601 in the picture processing apparatus of the fourth embodiment decides whether the motion components should be added to the picture or not, on the basis of whether the input change information is larger than the threshold. However, the threshold judgement processing unit is not limited to this type of unit. Any threshold judgement processing unit can be used as long as it performs different processings for the input motion vectors on the basis of the comparison result as to whether the input change information is larger than the threshold or not.

Embodiment 5

A picture processing apparatus according to a fifth embodiment of the present invention generates motion information on the basis of motion vectors and adds the motion information to picture data, as the first embodiment. However, the fifth embodiment is different from the first embodiment in that the apparatus of the fifth embodiment multiplies a value of the motion vector for each macroblock by a predetermined factor, thereby to generate the motion information and add the motion information to the picture data.

Figure 17:
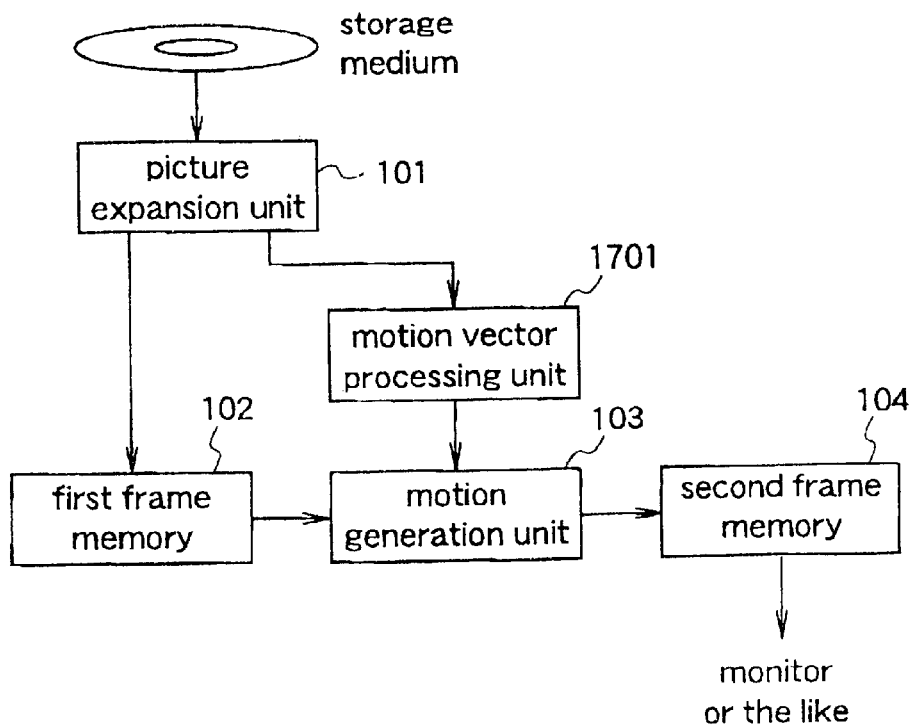
FIG. 17 is a block diagram illustrating a whole structure of a picture processing apparatus according to a fifth embodiment of the present invention.

FIG. 17 is a block diagram illustrating a whole structure of the picture processing apparatus of the fifth embodiment. As shown in the figure, the picture processing apparatus of the fifth embodiment comprises a picture expansion unit 101, a first frame memory 102, a motion generation unit 103, a second frame memory 104, and a motion vector processing unit 1701. The structure of the apparatus of the fifth embodiment is obtained by adding the motion vector processing unit 1701 to the whole structure of the picture processing apparatus of the first embodiment (FIG. 1). Here, the picture expansion unit 101, the first frame memory 102, the motion generation unit 103, and the second frame memory 104 in the picture processing apparatus of the fifth embodiment are the same as those in the first embodiment. Accordingly, the same numerals as those in the first embodiment are given to these elements and they are not described here.

The motion vector processing unit 1701 receives a motion vector (x,y) and macroblock identification data corresponding to this motion vector from the picture expansion unit 101, generates a second motion vector (x',y') for picture data generated by the motion generation unit 103 and macroblock identification data corresponding to the second motion vector, and outputs the second motion vector and the macroblock identification data to the motion generation unit 103.

That is, the motion vector processing unit 1701 of the fifth embodiment multiplies the input motion vector (x,y) by a predetermined factor, and outputs a second motion vector (x',y') to the motion generation unit 103. The motion generation unit 103 generates displayed picture data by using the second motion vector (x',y').

Figure 18:
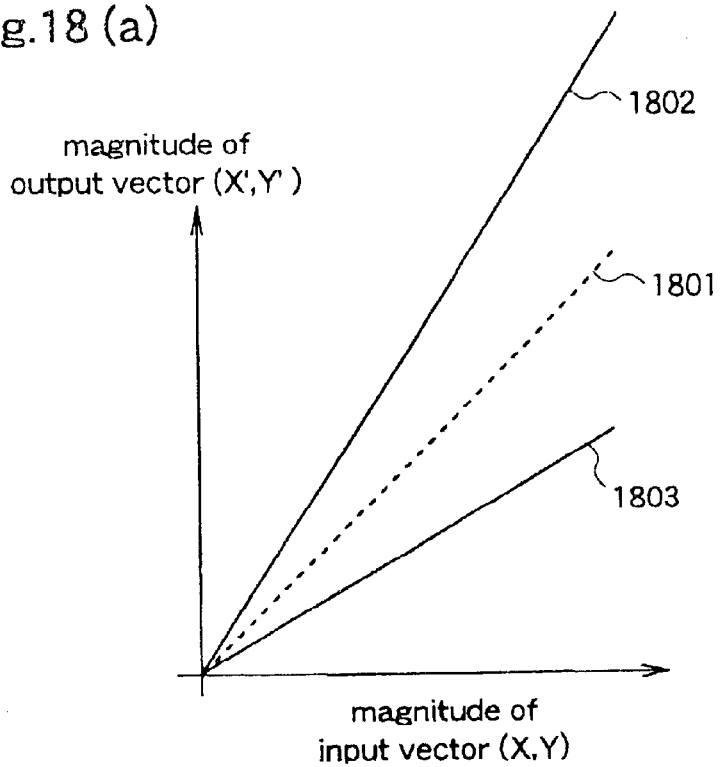
FIGS. 18(a) and 18(b) are diagrams for explaining a processing by a motion vector processing unit.
Figure 18:
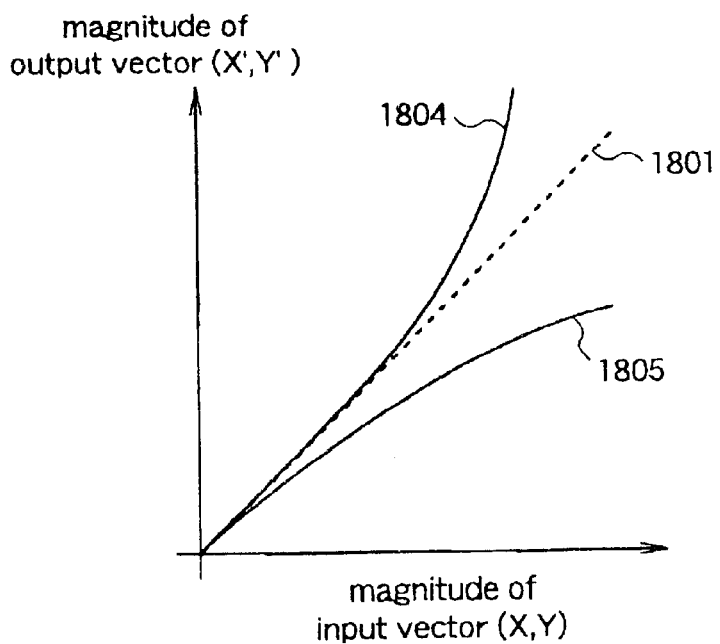

FIG. 18(*a*) is a diagram showing relationships between the magnitude of the input motion vector (x,y) and the magnitude of the second motion vector (x',y') obtained by multiplying the motion vector (x,y) by the predetermined factor.

In FIG. 18(*a*), a broken line 1801 shows a relationship between the magnitudes of the input and output vectors in a case where the input vector is multiplied by no factor. A full line 1802 shows a relationship between the magnitudes of the input and output vectors in a case where the input vector is multiplied by a factor larger than 1. A full line 1803 shows a relationship between the magnitudes of the input and output vectors in a case where the input vector is multiplied by a factor smaller than 1.

For example, when the input vector is multiplied by the factor larger than 1 as shown by the full line 1802, values of the output second motion vector (x'y') are larger than the values of the case where the input vector is multiplied by no factor (broken line 1801). That is, when the motion generation unit 103 gives motion information to a picture using this second motion vector (x',y'), the picture generated and output to the second frame memory 104 has an emphasized motion relative to the case where the input vector is multiplied by no factor.

On the other hand, when the input vector is multiplied by a factor smaller than 1 as shown by the full line 1803, values of the output second motion vector (x',y') are smaller than the values of the case where the input vector is multiplied by no factor (broken line 1801). That is, when the motion generation unit 103 gives the motion information to a picture using this second motion vector (x',y'), the picture generated and output to the second frame memory 104 has suppressed a motion relative to the case where the input vector is multiplied by no factor.

FIG. 18(b) is a diagram showing examples of relationships between the magnitudes of the input and output motion vectors when the factor to be multiplied is changed according to the magnitude of the input motion vector (x,y)

In FIG. 18(b), a broken line 1801 shows a relationship between the magnitudes of the input and output vectors in a case where the input vector is multiplied by no factor. A full line 1804 shows a relationship between the magnitudes of the input and output vectors in a case where a factor to be multiplied is gradually increased from 1 according to the magnitude of the input motion vector (x,y). A full line 1805 shows a relationship between the magnitudes of the input and output vectors in a case where a factor to be multiplied is gradually reduced from 1 according to the magnitude of the input motion vector (x,y).

For example, when the factor to be multiplied is gradually increased from 1 according to the magnitude of the input motion vector (x,y) as shown by the full line 1802, values of the output second motion vector (x',y') are larger than the values of the case where the input vector is multiplied by no factor (broken line 1801). That is, when the motion generation unit 103 gives motion information to a picture using this second motion vector (x',y'), the picture generated and output to the second frame memory 104 has an emphasized motion relative to the case where the input vector is multiplied by no factor.

On the other hand, when the factor to be multiplied is reduced from 1 according to the magnitude of the input motion vector (x,y) as shown by the full line 1803, values of the output second vector (x',y') are smaller than the values of the case where the input vector is multiplied by no factor (broken line 1801). That is, when the motion generation unit 103 gives motion information to a picture using this second motion vector (x',y'), the picture generated and output to the second frame memory 104 has a suppressed motion relative to the case where the input vector is multiplied by no factor.

As described above, in the fifth embodiment, the motion vector processing unit 1701 is provided and thereby the magnitude of the motion vector input to the motion generation unit 103 can be changed and an emphasized or suppressed motion can be added to the picture.

Therefore, in addition to the effects as those in the first embodiment, the apparatus of the fifth embodiment can generate a picture having an emphasized motion information added thereto, or contrary, generate a picture having a suppressed motion information added thereto Accordingly, a picture processing apparatus can generate and display a picture to which more dynamic presence is added or motion information is added with the presence being reduced.

The picture processing apparatus of the fifth embodiment has the structure obtained by adding the motion vector processing unit 1701 to the picture processing apparatus of the first embodiment. However, also a structure which is obtained by adding the motion vector processing unit 1701 to the picture processing apparatus of the second or third embodiment can obtain the same effects as those described above.

Further, the picture processing apparatus of the fifth embodiment can be combined with the threshold judgement processing unit 1601 in the picture processing apparatus of the fourth embodiment. In this case, the apparatus decides whether the input vector is to be multiplied by a predetermined factor or changes a value of the factor to be multiplied, on the basis of whether the input motion vector is the threshold or larger.

Embodiment 6

A picture processing apparatus according to a sixth embodiment generates motion information on the basis of motion vectors and adds the motion information to picture data, as the first embodiment. However, the sixth embodiment is different from the first embodiment in that the apparatus of the sixth embodiment judges a region of picture data as a processing target, generates the motion information on the basis of the judged result, and adds the motion information to the picture data.

Figure 19:
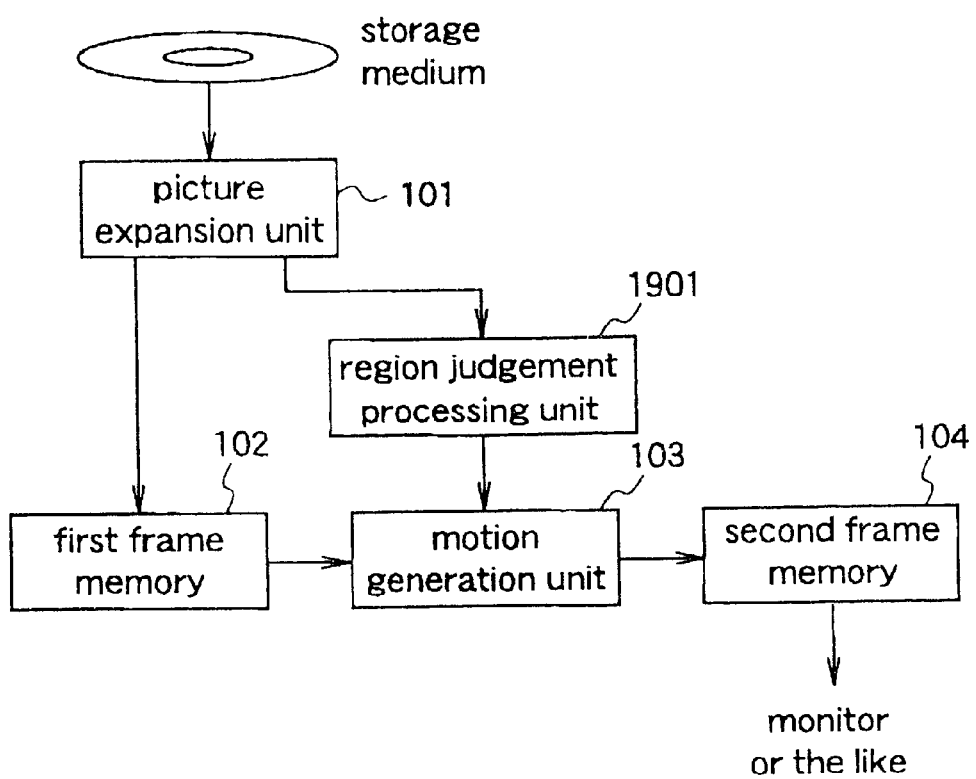
FIG. 19 is a block diagram illustrating a whole structure of a picture processing apparatus according to a sixth embodiment of the present invention.

FIG. 19 is a block diagram illustrating a whole structure of the picture processing apparatus of the sixth embodiment. As shown in the figure, the picture processing apparatus of the sixth embodiment comprises a picture expansion unit 101, a first frame memory 102, a motion generation unit 103, a second frame memory 104, and a region judgement processing unit 1901. The structure of the picture processing apparatus of the sixth embodiment is obtained by adding the region judgement processing unit 1901 to the whole structure of the picture processing apparatus of the first embodiment (FIG. 1). Here, the picture expansion unit 101, the first frame memory 102, the motion generation unit 103, and the second frame memory 104 in the picture processing apparatus of the sixth embodiment are the same as those in the first embodiment. Accordingly, the same numerals as those in the first embodiment are given to these elements and they are not described here.

The region judgement processing unit 1901 receives a motion vector (x,y) and macroblock identification data corresponding to this motion vector from the picture expansion unit 101, generates a second motion vector (x',y') for picture data generated by the motion generation unit 103 and macroblock identification data corresponding to the second motion vector, and outputs the second motion vector and the macroblock identification data to the motion generation unit 103.

That is, the region judgement processing unit 1901 judges a region of picture data as a processing target, and decides the second motion vector which is output for each region as the processing target.

Figure 20:
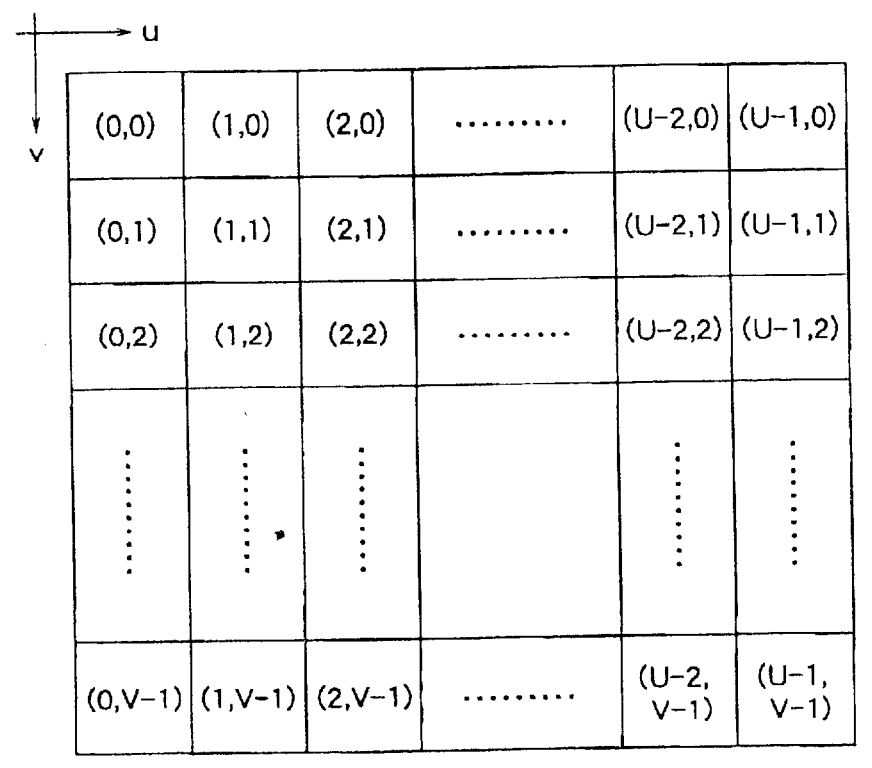

FIG. 20 is a diagram illustrating macroblocks constituting picture data stored in the first frame memory 102. Here, the picture data shown in FIG. 20 consists of U pieces of macroblocks in the traverse direction and V pieces of macroblocks in the longitudinal direction. As shown in the figure, the position of the macroblock is shown using coordinates u in the traverse direction and v in the longitudinal direction.

The region judgement processing unit 1901 decides the position of a macroblock as a processing target from input information (u,v) indicating the position of a macroblock, i.e. the macroblock identification data. For example, when the motion information is not added to the periphery of a generated displayed picture data, a region to be a processing target is defined by following judgement conditions:

$$2 \leq u < U-2 \text{ and } 2 \leq v < V-2$$

And as for motion vectors corresponding to the macroblock which satisfies the conditions, the input motion vector (x,y)

and the output second motion vector (x',y') have the same values. On the other hand, as for the motion vectors corresponding to a macroblock which does not satisfy the conditions, the output second motion vector (x',y') is (0,0). Here, the above-described conditions for judging the region can be decided from contents of picture data (video and character) or the like.

Accordingly, the motion generation unit 103 generates a picture having the motion components added thereto by using the second motion vector (x',y') which is output from the region judgement processing unit 1901, and outputs the picture to the second frame memory 104. Therefore, the second frame memory 104 can obtain a generated picture where the motion information is not added to the periphery thereof.

Therefore, in the sixth embodiment, the region judgement processing unit 1901 is provided and thereby a region where the motion information is added can be arbitrarily decided. Accordingly, in addition to the effects of the first embodiment, a part in which dynamic presence is to be given can be distinguished from other parts according to provided picture data. For example, in the case of a movie including subtitles, pictures in the subtitle part are generated without motion information so as to make the subtitles legible. On the other hand, motion information is added in video parts and pictures having the presence are generated.

When the second motion vector (x',y')=(0,0) is input to the motion generation unit 103, the motion generation unit 103 has no necessity of performing the weighted addition and a pixel stored in the first frame memory 102 can be stored in the second frame memory 104 as it is. Accordingly, the processing amount of the weighted addition unit 204 which performs the weighted addition in the motion generation unit 103 can be reduced, thereby increasing the processing speed.

The region judgement processing unit 1901 of the picture processing apparatus of the sixth embodiment judges whether a part is to be processed or not. However, the region judgement processing unit is not limited to this type of unit. As long as the region judgement processing unit 1901 judges a region as a processing target and performs different processings for each judged region, any unit can be utilized.

The picture processing apparatus of the sixth embodiment has the structure which is obtained by adding the region judgement processing unit 1901 to the picture processing apparatus of the first embodiment. However, also a structure which is obtained by adding the region judgement processing unit 1901 to the picture processing apparatus of the second or third embodiment can obtain the same effects as those described above.

Further, the picture processing apparatus of the sixth embodiment can be combined with the picture processing apparatus of the fourth or fifth embodiment. In this case, in addition to the effects of the picture processing apparatus of the sixth embodiment, the effects of the picture processing apparatus of the fourth or fifth embodiment can be also obtained.

In the first to sixth embodiment, a motion vector is added to each macroblock in the coded picture data. However, the picture processings shown in the first to sixth embodiments can be performed by using a motion vector which is added to each of various processing units such as each frame or each object, whereby the same effects can be obtained.

Also when picture data is inter-frame coded, in many cases, some frames of picture data are intra-frame coded and frames adjacent in the time series (P frames or B frames) are inter-frame coded on the basis of the intra-frame coded frame (I frame), and only differences are processing, thereby increasing compressibility. Therefore, while motion vectors are added to coded data of the P frames or B frames which are inter-frame coded, no motion vector is added to the I frames. When picture data of these I frames is processed, the processing is performed by using the motion vectors added to picture data of the P frames or B frames which are adjacent in the time series, whereby the same effects can be obtained. Since the inter-frame coding is inherently based on the correlation of the picture data adjacent in the time series, good motion information can be obtained even when the motion vectors of the picture data having a high correlation are used.

What is claimed is:

1. A picture processing apparatus which receives picture data and change information as information for indicating a temporal change in the picture data, and generates displayed picture data, comprising:

a motion generation unit for performing weighted addition for pixels constituting the picture data on the basis of the change information, and generating the displayed picture data.

2. The picture processing apparatus of claim 1 wherein the motion generation unit uses the change information which is previously added to each unit picture data, thereby to perform the weighted addition for pixels constituting the unit picture data.

3. The picture processing apparatus of claim 1 wherein the motion generation unit generates, on the basis of plural pieces of the change information which is previously added to each unit picture data, change information corresponding to processing unit picture data which is a smaller unit than the unit picture data, and uses the generated change information corresponding to the processing unit picture data, thereby to perform the weighted addition for pixels constituting the processing unit picture data.

4. The picture processing apparatus of claim 2 wherein the motion generation unit comprises:

a move amount and weighting factor decision unit for deciding a move amount and weighting factors for each pixel, from the change information;

a processing target pixel decision unit for deciding a pixel as a processing target on the basis of the move amount; and a weighted addition unit for performing the weighted addition for pixel data of the pixel as the processing target, by using the weighting factors.

5. The picture processing apparatus of claim 3 wherein the motion generation unit comprises:

a motion vector interpolation unit for generating, on the basis of plural pieces of the change information which is added to each unit picture data, change information corresponding to the processing unit picture data which is a smaller unit than the unit picture data;

a move amount and weighting factor decision unit for deciding a move amount and weighting factors for each pixel, from the change information corresponding to the processing unit picture data;

a processing target pixel decision unit for deciding a pixel as a processing target, on the basis of the move amount; and a weighted addition unit for performing the weighted addition for pixel data of the pixel as the processing target, by using the weighting factors.

6. The picture processing apparatus of claim 1 wherein the motion generation unit obtains change information transition information for indicating a temporal change in the change information, and performs the weighted addition for the pixels constituting the picture data on the basis of the obtained change information transition information, thereby to generate the displayed picture data.

7. The picture processing apparatus of claim 4 wherein the move amount and weighting factor decision unit comprises a change information storage unit for storing the input change information, and decides the move amount and the weighting factors for each pixel on the basis of plural pieces of change information at different times, which change information is stored in the change information storage unit.

8. The picture processing apparatus of claim 1 further comprising a reproduction information input unit for inputting reproduction information which indicates a display state of the displayed picture data, wherein
the motion generation unit generates the displayed picture data by using the reproduction information.

9. The picture processing apparatus of claim 1 further comprising a threshold judgement processing unit for comparing the input change information with a threshold, and generating second change information on the basis of a result of the comparison, wherein
the motion generation unit generates the displayed picture data by using the second change information.

10. The picture processing apparatus of claim 1 further comprising a motion vector processing unit for multiplying a value of the input change information by a predetermined factor and generating second change information, wherein
the motion generation unit generates the displayed picture data by using the second change information.

11. The picture processing apparatus of claim 1 further comprising a region judgement unit for judging a region of the picture data, as a processing target.

12. A picture processing method which receives picture data and change information as information for indicating a temporal change in the picture data, and generates displayed picture data, comprising a step of:
performing weighted addition for pixels constituting the picture data on the basis of the change information, thereby generating the displayed picture data.

13. The picture processing method of claim 12 comprising a step of:
using the change information which is previously added to each unit picture data, thereby performing the weighted addition for pixels constituting the unit picture data.

14. The picture processing method of claim 12 comprising steps of:
on the basis of plural pieces of the change information which is previously added to each unit picture data, generating change information corresponding to processing unit picture data which is a smaller unit than the unit picture data; and
using the generated change information corresponding to the processing unit picture data, thereby performing the weighted addition for pixels constituting the processing unit picture data.

15. The picture processing method of claim 12 comprising steps of:
obtaining change information transition information for indicating a temporal change in the change information; and
performing the weighted addition for the pixels constituting the picture data on the basis of the obtained change information transition information, thereby generating the displayed picture data.

16. The picture processing method of claim 12 comprising a step of:
receiving reproduction information for indicating a display state of the displayed picture data, and generating the displayed picture data by using the reproduction information.

17. The picture processing method of claim 12 comprising a step of:
comparing the input change information with a threshold, and generating the displayed picture data by using second change information generated on the basis of a result of the comparison.

18. The picture processing method of claim 12 comprising a step of:
generating the displayed picture data by using second change information generated by multiplying a value of the input change information by a predetermined factor.

19. The picture processing method of claim 12 comprising a step of:
judging a region of the picture data as a processing target, thereby generating the displayed picture data by using a result of the judgement.

20. A computer readable recording medium on which a program for causing a computer to execute weighted addition for pixels constituting picture data on the basis of change information as information for indicating a temporal change in the picture data is recorded.

* * * * *